(12) United States Patent
Constantinides

(10) Patent No.: US 12,147,443 B2
(45) Date of Patent: Nov. 19, 2024

(54) SYSTEM AND METHOD FOR AGGREGATION AND GRADUATED VISUALIZATION OF USER GENERATED SOCIAL POST ON A SOCIAL MAPPING NETWORK

(71) Applicant: You Map Inc., Baltimore, MD (US)

(72) Inventor: Stephen Constantinides, Baltimore, MD (US)

(73) Assignee: You Map Inc., Baltimore, MD (US)

( * ) Notice: Subject to any disclaimer, the term of this patent is extended or adjusted under 35 U.S.C. 154(b) by 0 days.

(21) Appl. No.: 18/204,362

(22) Filed: May 31, 2023

(65) Prior Publication Data

US 2023/0385294 A1 Nov. 30, 2023

Related U.S. Application Data

(63) Continuation of application No. 17/384,746, filed on Jul. 24, 2021, now Pat. No. 11,704,329, which is a
(Continued)

(51) Int. Cl.
*G06F 16/248* (2019.01)
*G06F 16/2455* (2019.01)
*G06F 16/2457* (2019.01)
*G06F 16/28* (2019.01)
*G06F 16/9535* (2019.01)
*G06F 16/9537* (2019.01)
(Continued)

(52) U.S. Cl.
CPC ...... *G06F 16/248* (2019.01); *G06F 16/24556* (2019.01); *G06F 16/24578* (2019.01); *G06F 16/287* (2019.01); *G06F 16/9535* (2019.01); *G06F 16/9537* (2019.01); *G06Q 30/02* (2013.01); *G06Q 50/01* (2013.01)

(58) Field of Classification Search
CPC ............ G06F 16/248; G06F 16/24556; G06F 16/24578; G06F 16/287; G06F 16/9535; G06F 16/9537; G06Q 30/02; G06Q 50/01
See application file for complete search history.

(56) References Cited

U.S. PATENT DOCUMENTS 5,859,639 A * 1/1999 Ebrahim ............... G06F 3/0481
715/977
8,340,691 B1 12/2012 Starenky
(Continued)

OTHER PUBLICATIONS

Cardone et al., The ParticipAct Mobile Crowd Sensing Living Lab: The Testbed for Smart Cities, Oct. 24, 2014, IEEE Communications Magazine (vol. 52, Issue 10), pp. 78-85 (Year: 2014).
(Continued)

*Primary Examiner* — Cam Y T Truong
(74) *Attorney, Agent, or Firm* — Redbrick IP, P.C.

(57) ABSTRACT

Systems and methods for receiving information associated with posts to a social network are described. Posts may be associated with a location. Symbols, portions or posts, or multiple symbols may be shown on a client device in an area of a map indicating a location associated with a post. Posts may be represented by symbols, which may include shapes, and such shapes may include emojis. An amount of symbols, posts, or portions of posts displayed on a client device may be determined at least in part by an area of a map displayed on a client device.

18 Claims, 11 Drawing Sheets

Related U.S. Application Data continuation of application No. 16/036,923, filed on Jul. 16, 2018, now Pat. No. 11,138,217, which is a continuation-in-part of application No. 16/035,380, filed on Jul. 13, 2018, now abandoned, and a continuation-in-part of application No. 15/189,691, filed on Jun. 22, 2016, now Pat. No. 11,436,619.

(60) Provisional application No. 62/549,447, filed on Aug. 24, 2017, provisional application No. 62/532,991, filed on Jul. 14, 2017, provisional application No. 62/532,007, filed on Jul. 13, 2017, provisional application No. 62/183,068, filed on Jun. 22, 2015.

(51) Int. Cl.
*G06Q 30/02* (2023.01)
*G06Q 50/00* (2012.01)

(56) References Cited

U.S. PATENT DOCUMENTS

| | | | |
|---|---|---|---|
| 8,606,792 | B1 | 12/2013 | Jackson et al. |
| 8,738,039 | B2 | 5/2014 | Forstall et al. |
| 8,788,973 | B2 | 7/2014 | Lavigne et al. |
| 8,996,625 | B1 | 3/2015 | Singleton |
| 9,183,807 | B2 | 11/2015 | Small et al. |
| 9,712,587 | B1 | 7/2017 | Alfishawi et al. |
| 9,826,345 | B2 | 11/2017 | Haro et al. |
| 10,387,574 | B1 | 8/2019 | Anders et al. |
| 10,616,727 | B2 | 4/2020 | Constantinides |
| 10,902,395 | B1 | 1/2021 | Knas et al. |
| 11,356,817 | B2 | 6/2022 | Constantinides |
| 11,696,097 | B2 | 7/2023 | Constantinides |
| 2003/0046307 | A1* | 3/2003 | Rivette .................. G06F 16/382 707/E17.093 |
| 2007/0109580 | A1* | 5/2007 | Yoshida .................. G06F 9/451 358/1.13 |
| 2007/0204218 | A1 | 8/2007 | Weber |
| 2007/0226063 | A1 | 9/2007 | Hanson |
| 2007/0226640 | A1* | 9/2007 | Holbrook .............. G06F 16/951 715/765 |
| 2008/0215994 | A1 | 9/2008 | Harrison et al. |
| 2008/0222295 | A1 | 9/2008 | Robinson et al. |
| 2008/0288406 | A1 | 11/2008 | Seguin et al. |
| 2010/0131366 | A1 | 5/2010 | Gibson et al. |
| 2010/0164957 | A1 | 7/2010 | Lindsay et al. |
| 2010/0180029 | A1 | 7/2010 | Fourman |
| 2010/0305855 | A1 | 12/2010 | Dutton et al. |
| 2011/0196855 | A1 | 8/2011 | Wable et al. |
| 2011/0238755 | A1 | 9/2011 | Khan et al. |
| 2011/0238762 | A1 | 9/2011 | Soni et al. |
| 2011/0238763 | A1 | 9/2011 | Shin et al. |
| 2011/0246910 | A1 | 10/2011 | Moxley et al. |
| 2012/0143963 | A1* | 6/2012 | Kennberg .............. H04L 67/52 709/206 |
| 2012/0324018 | A1 | 12/2012 | Metcalf |
| 2013/0005352 | A1 | 1/2013 | Jones et al. |
| 2013/0054699 | A1* | 2/2013 | Macaskill ............ G06Q 10/101 709/204 |
| 2013/0060873 | A1 | 3/2013 | Gautam et al. |
| 2013/0066963 | A1 | 3/2013 | Odio et al. |
| 2013/0072235 | A1 | 3/2013 | Fortall et al. |
| 2013/0073387 | A1 | 3/2013 | Heath |
| 2013/0073970 | A1 | 3/2013 | Piantino et al. |
| 2013/0080922 | A1 | 3/2013 | Elias et al. |
| 2013/0104238 | A1 | 4/2013 | Balsan et al. |
| 2013/0110631 | A1 | 5/2013 | Mitchell et al. |
| 2013/0139070 | A1 | 5/2013 | Baldwin et al. |
| 2013/0196690 | A1 | 8/2013 | Crowley et al. |
| 2013/0198661 | A1 | 8/2013 | Matas |
| 2013/0232011 | A1 | 9/2013 | Gupta et al. |
| 2013/0242262 | A1 | 9/2013 | Lewis |
| 2013/0321390 | A1 | 12/2013 | Latta et al. |
| 2014/0002442 | A1 | 1/2014 | Lamb et al. |
| 2014/0046591 | A1 | 2/2014 | Boldyrev et al. |
| 2014/0059665 | A1 | 2/2014 | Albani |
| 2014/0101601 | A1 | 4/2014 | Tang |
| 2014/0181193 | A1 | 6/2014 | Narasimhan et al. |
| 2014/0236882 | A1 | 8/2014 | Rishe |
| 2014/0250200 | A1 | 9/2014 | Geurts et al. |
| 2014/0274564 | A1 | 9/2014 | Greenbaum |
| 2014/0280278 | A1 | 9/2014 | Harris et al. |
| 2014/0316192 | A1 | 10/2014 | Zambotti et al. |
| 2014/0316691 | A1 | 10/2014 | Ren et al. |
| 2014/0324797 | A1 | 10/2014 | Yung et al. |
| 2014/0359537 | A1 | 12/2014 | Jacckobson et al. |
| 2015/0032766 | A1 | 1/2015 | Greenbaum |
| 2015/0039443 | A1 | 2/2015 | Soonnn-Shiong |
| 2015/0058255 | A1 | 2/2015 | Cork |
| 2015/0061825 | A1 | 3/2015 | Suzuki et al. |
| 2015/0073693 | A1 | 3/2015 | Yang et al. |
| 2015/0112753 | A1 | 4/2015 | Suvarna |
| 2015/0113007 | A1 | 4/2015 | Hatchard |
| 2015/0058324 | A1 | 5/2015 | Kauwe |
| 2015/0127535 | A1 | 5/2015 | Chavarria et al. |
| 2015/0154269 | A1* | 6/2015 | Miller .................. G06F 16/2477 715/780 |
| 2015/0169142 | A1 | 6/2015 | Longo et al. |
| 2015/0188873 | A1 | 7/2015 | Halliday |
| 2015/0245168 | A1 | 8/2015 | Martin |
| 2015/0262208 | A1 | 9/2015 | Bjontegard |
| 2015/0310497 | A1 | 10/2015 | Socolof |
| 2015/0325226 | A1 | 11/2015 | Rosedale et al. |
| 2015/0334077 | A1 | 11/2015 | Feldman |
| 2015/0378587 | A1 | 12/2015 | Falaki et al. |
| 2016/0019661 | A1 | 1/2016 | Bouganim et al. |
| 2016/0029368 | A1 | 1/2016 | Borenstein et al. |
| 2016/0055250 | A1 | 2/2016 | Rush |
| 2016/0080438 | A1 | 3/2016 | Liang |
| 2016/0087927 | A1* | 3/2016 | Crudele ................ H04L 51/222 709/206 |
| 2016/0110381 | A1 | 4/2016 | Chen et al. |
| 2016/0116292 | A1 | 4/2016 | An |
| 2016/0140328 | A1* | 5/2016 | Pathak .................... H04L 63/20 726/1 |
| 2016/0142894 | A1 | 5/2016 | Papakonstantinou et al. |
| 2016/0169696 | A1 | 6/2016 | Butts et al. |
| 2016/0171582 | A1 | 6/2016 | Linden |
| 2016/0203223 | A1 | 7/2016 | Hladik |
| 2016/0232131 | A1 | 8/2016 | Liu et al. |
| 2016/0321551 | A1 | 11/2016 | Priness et al. |
| 2016/0350953 | A1 | 12/2016 | Mittelstaedt et al. |
| 2017/0109807 | A1 | 4/2017 | Krishnan et al. |
| 2017/0127128 | A1 | 5/2017 | Seger |
| 2017/0134508 | A1 | 5/2017 | Kalis et al. |
| 2017/0169168 | A1 | 6/2017 | Batchelor et al. |
| 2017/0193075 | A1 | 7/2017 | Hegelich et al. |
| 2017/0214646 | A1 | 7/2017 | Longo et al. |
| 2017/0220966 | A1 | 8/2017 | Wang |
| 2017/0295127 | A1 | 10/2017 | He |
| 2018/0004762 | A1 | 1/2018 | Jazayeri |
| 2018/0006993 | A1 | 1/2018 | Jazayeri |
| 2018/0060778 | A1 | 3/2018 | Guo et al. |
| 2018/0121029 | A1 | 5/2018 | Mrad et al. |
| 2018/0176271 | A1 | 6/2018 | Laurent |
| 2018/0293308 | A1* | 10/2018 | Miller ................... G06F 16/345 |
| 2018/0315134 | A1 | 11/2018 | Amitay |
| 2020/0242182 | A1 | 7/2020 | Gokyigit |
| 2021/0097631 | A1 | 4/2021 | Mercs |

OTHER PUBLICATIONS

J. Jiang, H. Lu, B. Yang and B. Cui, "Finding top-k local users in geo-tagged social media data," 2015 IEEE 31st International Conference on Data Engineering, 2015, pp. 267-278, doi: 10.1109/ICDE.2015.7113290. (Year: 2015).

R. Rizia, M. Tanviruzzaman and S. I. Ahamed, "KnockAround: Location Based Service via Social Knowledge," 2012 IEEE 36th Annual Computer Software and Applications Conference, 2012, pp. 623-631, doi: 10.1109/COMPSAC.2012.88. (Year: 2012).

X. Liang, K. Zhang, R. Lu, X. Lin and X. Shen, "EPS: An Efficient and Privacy-Preserving Service Searching Scheme for SmartCom-

(56) References Cited

OTHER PUBLICATIONS munity," in IEEE Sensors Journal, vol. 13, No. 10, pp. 3702-3710, Oct. 2013, doi: 10.1109/JSEN.2013.2263793. (Year: 2013).
"I. Cho, R. Wesslen, S. Volkova, W. Ribarsky and W. Dou, ""CrystalBall: A Visual Analytic System for Future Event Discovery and Analysis from Social Media Data,"" 2017 IEEE Conference on Visual Analytics Science and Technology (VAST), 2017, pp. 25-35,doi: 10.1109NAST.2017.8585658 (Year: 2017)".
"F. Zhang, A. Kondoro and S. Muftic, ""Location-Based Authentication and Authorization Using Smart Phones, "" 2012 EEE 11th International Conference on Trust, Security and Privacy in Computing and Communications, 2012, pp. 1285-1292, doi: 10.1109/TrustCom.2012.198. (Year: 2012)".
International Search Report and Written Opinion received in PCT/US18/42169, mailed on Sep. 24, 2018 (10 pages).
International Search Report and Written Opinion received in PCT/US18/42355, mailed on Oct. 1, 2018 (10 pages).
J. Jacob, K. Jha, P. Kotak and S. Puthran, "Mobile attendance using Near Field Communication and One-Time Password," 2015 International Conference on Green Computing and Internet ofThings (ICGCIoT), 2015, pp. 1298-1303.
Y. Tian, W. Wei, Q. Li, F. Xu and S. Zhong, "MobiCrowd: Mobile Crowdsourcing on Location-based Social Networks," IEEE INFOCOM 2018—IEEE Conference on Computer Communications, Honolulu, HI, USA, 2018, pp. 2726-2734, doi: 10.1109/INFOCOM.2018.8486433. (Year: 2018).
"R. Wang et al., ""Taxi Rec: Recommending Road Clusters to Taxi Drivers Using Ranking-Based Extreme Learning Machines,"" in IEEE Transactions on Knowledge and Data Engineering, vol. 30, No. 3, pp. 585-598, Mar. 1, 2018, doi: 10.1109/TKDE 2017.2772907. (Year: 2018)".
"D. Widdows, J. Lucas, M. Tang and W. Wu, ""GrabShare: The construction of a realtime ridesharing service,"" 2017 2nd IEEE International Conference on Intelligent Transportation Engineering (ICITE), 2017, pp. 138-143, doi: 10.1109/ICITE.2017.8056896. (Year: 2017)".
J. A. B. Perera, D. Zhang and M. Lu, "Smart Maps through Semantic Web, Social Media, and Sentiment Analysis," 2015 IEEE International Conference on Information Reuse and Integration, San Francisco, CA, 2015, pp. 49-56, doi: 10.1109/IRI.2015.18. (Year. 2015).
K. Kesorn, W. Juraphanthong and A. Salaiwarakul, "Personalized Attraction Recommendation System for Tourists Through Check-In Data," in IEEE Access, vol. 5, pp. 26703-26721, 2017, doi: 10.1109/ACCESS.2017.2778293. (Year. 2017).
C. P. M. Pombinho, M. B. Carma and A P. Afonso, "Evaluation of Overcluttering Prevention Techniques for Mobile Devices," 2009 13th International Conference Information Visualisation, Barcelona, Spain, 2009, pp. 127-134, doi: 10.1109/IV 2009.51. (Year: 2009).
B. Valdestilhas, A Scherp et al. "Using Semiotic Profiles to Design Graphical User Interfaces for Social Media Data Spaces on Mobile Phone Screens," 2013 13th International Conference on Computational Science and Its Applications, Ho Chi Minh City, Vietnam, 2013, pp. 115-118, doi: 10.1109/IC (Year: 2013).
Akther, K. M, et al., "Social network and user context assisted personalization for recommender systems" , International Conference on Innovations in Information Technology (IIT), Abu Dhabi, United Arab Emirates, 2012, 95-100.
A X. Zhang, et al., "Hoodsquare: Modeling and Recommending Neighborhoods in Location-Based Social Networks," 2013 International Conference on Social Computing, Alexandria, VA, USA, 2013, pp. 69-74, doi: 10.1109/SocialCom.2013.17. (Year: 2013).

\* cited by examiner

SYSTEM AND METHOD FOR AGGREGATION AND GRADUATED VISUALIZATION OF USER GENERATED SOCIAL POST ON A SOCIAL MAPPING NETWORK

CROSS-REFERENCE TO RELATED APPLICATIONS

This application is a continuation of and claims priority to copending U.S. patent application Ser. No. 17/384,746, "SYSTEM AND METHOD FOR AGGREGATION AND GRADUATED VISUALIZATION OF USER GENERATED SOCIAL POST ON A SOCIAL MAPPING NETWORK". U.S. patent application Ser. No. 17/384,746 is a continuation of and claims priority to Ser. No. 16/036,923, "SYSTEM AND METHOD FOR AGGREGATION AND GRADUATED VISUALIZATION OF USER GENERATED SOCIAL POST ON A SOCIAL MAPPING NETWORK", filed Jul. 16, 2018, the entire disclosure of which is incorporated by reference herein, in its entirety, for all purposes. U.S. patent application Ser. No. 16/036,923 claims the benefit of and priority to U.S. Provisional Patent Application Ser. No. 62/549,447, "SYSTEM AND METHOD FOR AGGREGATION AND GRADUATED VISUALIZATION OF USER GENERATED SOCIAL POST ON A SOCIAL MAPPING NETWORK", filed Aug. 24, 2017, the entire disclosure of which is incorporated by reference herein, in its entirety, for all purposes. U.S. patent application Ser. No. 16/036,923 claims the benefit of and priority to U.S. Provisional Patent Application Ser. No. 62/532,991, "SYSTEM AND METHOD FOR AGGREGATION AND GRADUATED VISUALIZATION OF USER GENERATED SOCIAL POST ON A SOCIAL MAPPING NETWORK", filed Jul. 14, 2017, the entire disclosure of which is incorporated by reference herein, in its entirety, for all purposes. U.S. patent application Ser. No. 16/036,923 is a continuation-in-part of and claims priority to copending U.S. patent application Ser. No. 15/189,691, "REAL TIME GEO-SOCIAL VISUALIZATION PLATFORM", filed Jun. 22, 2016, the entire disclosure of which is incorporated by reference herein, in its entirety, for all purposes. U.S. patent application Ser. No. 15/189,691 claims the benefit of and priority to U.S. Provisional Patent Application Ser. No. 62/183,068, "REAL TIME GEO-SOCIAL VISUALIZATION PLATFORM", filed Jun. 22, 2015, the entire disclosure of which is incorporated by reference herein, in its entirety, for all purposes. This application is a continuation-in-part of and claims priority to copending U.S. patent application Ser. No. 16/035,380, "SYSTEM AND METHOD FOR PRESENTING COMMUNITY EMOTIVE DATA GEOGRAPHICALLY ON A SOCIAL MAPPING NETWORK", filed Jul. 13, 2018, the entire disclosure of which is incorporated by reference herein, in its entirety, for all purposes. U.S. patent application Ser. No. 16/035,380 claims the benefit of and priority to U.S. Provisional Patent Application Ser. No. 62/532,007, "SYSTEM AND METHOD FOR PRESENTING COMMUNITY EMOTIVE DATA GEOGRAPHICALLY ON A SOCIAL MAPPING NETWORK", filed Jul. 13, 2017, the entire disclosure of which is incorporated by reference herein, in its entirety, for all purposes.

BACKGROUND

Recent advancements in computing technology and Global Navigation Satellite Systems (GNSS) have led to a movement for creating Internet-connected devices associated with their locations. Less expensive hardware has contributed to a trend in which traditional devices that connected via telephony and the Internet (e.g., email) now include location sharing. This has also led to significant technical challenges in the development of client software and services to fully utilize these devices' capabilities.

As the number and type of network-connected computing devices has increased, there has been a fragmentation of content availability and quality among the various platforms. While some platforms provide social networking with friends, they may not provide information on where a particular friend is located. Further, current systems are not configured well to display where friends are located, where posts on a network are made, and where posts associated with locations are made.

Thus, there is a need in the art for devices and systems that allow users to view posts in a digestible manner. Problems described herein are difficult to solve, and require unobvious solutions—which is the main reason such a social network has not been created. The inventions require the technological developments of today's portable devices including GNSS receivers and various networks, and would not have been possible even a few years ago.

The disclosures herein are not a small leap over the prior art, but rather a technological disruption in the social media space. A complete rethinking was required to produce solutions to the difficult problems presented herein.

SUMMARY

Embodiments provide technical solutions to the aforementioned and other technical problems. For example, in one aspect, a method allows for submitting a social media post that includes a graphical symbol. The graphical symbol may be selected by a user, and can be associated with an emotional state (e.g., sad, happy, angry). In addition, an emotional state may correspond to a color which may represent that emotional state. At some point, attributes on a screen located on a device a user is using can be determined. For instance, a size of a screen can be determined. After, information included in the social media post can be displayed on the screen, where an amount of the social media post displayed can be based on the size of the screen. Text may include information included in a social media post, and be displayed based on screen attributes. The text may be altered (e.g., more text may be shown or less) based on a screen size. When there is more than one social media post, an aggregate symbol may be displayed which includes an image. This image may be based on an attribute of aggregated social media posts and a color corresponding with an emotional state.

In general, in one aspect, embodiments relate to a system for providing location information on a social network. A client device may submit a social media post which includes a graphical symbol selected by a user of the client device, as well as an emotional state value selected by the user. Also, the emotional state value may correspond with a color. The client device's screen attributes may be determined, and information about a social media post may be displayed based on the client device's screen attributes. Text may be shown on the client device, and more or less text may be shown/altered based on the screen attributes. An aggregated symbol may be displayed and include an image based on one or more social media posts and a color corresponding with an emotional state value.

In general, in one aspect, embodiments relate to a non-transitory computer-readable storage medium including a set of instructions for providing content, the instructions configured to execute on at least one computer processor to enable the computer processor to: submit a social media post including a graphical symbol selected by a user that submitted the social media post. The post may be associated with an emotional state value, which may correspond with a color. Screen attributes of a device used by the user may be determined, such as its size. Information included in the social media post may be displayed, and the amount of information displayed may be made based on the screen attributes. Information shown may include text, and that text may be altered in response to a screen size or other factors. The screen may also display an aggregated symbol based on attributes of various symbols and a color corresponding with a social media post and an emotional state value.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
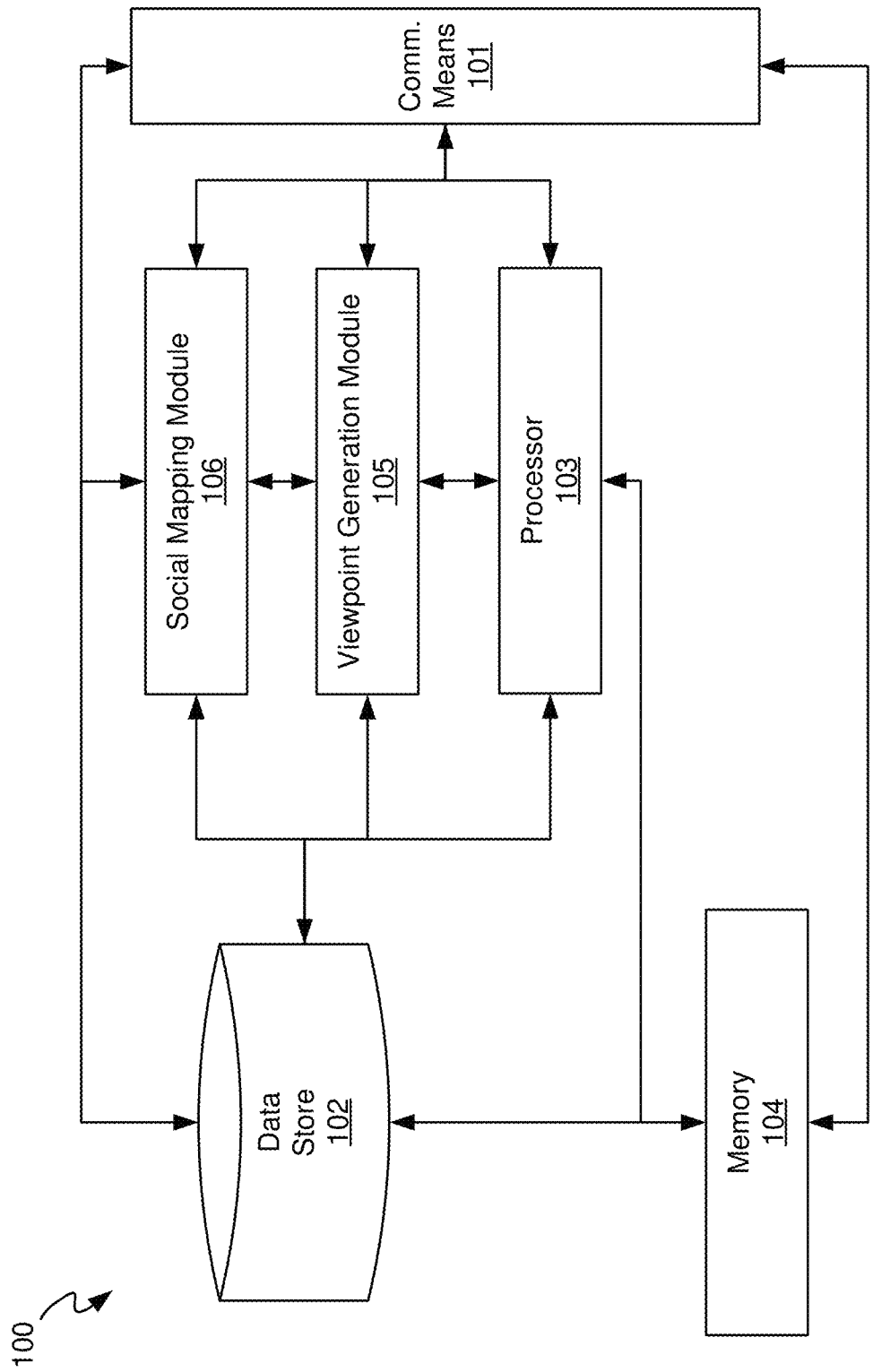
FIGS. 1-2 illustrate exemplary schematic diagrams of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, one or more embodiments of the invention provide for a social networking system capable of representing a large number of user postings on a map on a mobile device. In one or more embodiments, the social networking system may run on a plurality of client computing devices that include a central processing unit (e.g., mobile devices). In one or more embodiments, methods and systems are described that enable the display of postings on a map, and displaying those postings in real- or near-real-time. By displaying postings in such a manner, a user may view experiences of various users in a city, region, or continent, and the system may provide for a convenient way for a user to understand a large amount of data associated with various location.

In one or more embodiments, systems described herein allow users to view posted information including observations, events, activities, experiences, and/or representations of emotions. Such postings may be included on a map shown on a mobile device. In one or more embodiments, postings may be represented as emojis, which may be geometric shapes that may be associated with a color that may represent an emotion (e.g., red for sad, blue for happy). For example, a user may post to the system, wherein the post includes a white circle with a hotdog illustration, and the post may be associated with a geographic location indicative of a store that sells hotdogs.

In one or more embodiments, many posts may be shown on a client device at a single time. When many posts are shown on a display, they many posts may be represented by one or more symbols (e.g., circles) that are different than what a post would be represented by if it were by itself. Such symbols representing many posts may be associated with a geographic area.

In one or more embodiments, one or more posts may be shown based on a relevance number. Such a relevance number may be calculated based on attributes associated with the one or more posts. Such attributes may include, but are not limited to: a date and/or time that a post was recorded (e.g., a number of hours since a post was made), a number of up votes or down votes received by a post, a number of comments a post has received, a number of upvotes comments of a post has received, a date and/or time of comments a post has received (e.g., a number of hours since a comment was posted), and/or a comment relevance.

An example calculation of the relevance of a symbol may be based on the formula:

$$MR=((100+(U-DV))\times(1-(D\times 0.01)))+CR \quad \text{(Equation 1)}$$

Where MR is a relevance of a symbol (e.g., a mapmoji (e.g., an emoji associated with/corresponding to an area on a map) relevance); where a date and time that a symbol was recorded/posted is D (e.g., a number of hours since the post was made (e.g., up to 84); where a number of up votes or down votes a symbol has received is (U−DV); where a number of comments a symbol has received is C; where a number of up votes a comment has received is CU−CDV; where a date and time of a comment is CD (e.g., a number of hours between a time a post was made and a comment was made); and where a comment relevance is CR and can be calculated by the formula:

$$CR=(100+(CD-CDV))\times(1-(CD\times 0.01)) \quad \text{(Equation 2)}$$

In one or more embodiments, a channel may be used to filter posts. For example, a keyword may be entered into a system by a user of a mobile device, and the various posts associated with the keyword (e.g., posts that include the keyword or are tagged with the keyword) may be shown, while other posts that are not associated with the keyword may not be shown. Herein, the terms channel and filters may be used interchangeably, and someone skilled in the art would understand that they substantially convey the same functionality.

FIG. 1 shows a system 100 for receiving location information on a social network. The system 100 includes a communication means 101, a data store 102, a processor 103, memory 104, a viewpoint generation module 105, and a social mapping module 106. Various components of system 100 can be located on a client device (e.g., a mobile device, personal computer, laptop, personal digital assistant, smartphone, kiosk, cable box, television) and/or a remote computer (e.g., a server, the cloud). In one or more embodiments there can be more than one of each separate component running on a device, as well as any combination of these components within a given embodiment of the invention. Further, in one or more embodiment a client device may receive information from a social network, such as a post, and/or a remote computer may receive information from a social network, such as a post.

In one or more embodiments, a social mapping module 106 may be included in system 100. A social mapping module 106 may execute on a computer processor and be configured to enable a computer processor to perform a variety of tasks. In one or more embodiments, a social mapping module may receive social mapping data (e.g., a post, which may be received from data store 102), where the social mapping data is associated with one or more geographic locations. For example, social mapping data may be used to identify and/or locate places where the social mapping data (e.g., posts) are being received from, and where viewpoints are focused.

In one or more embodiments, a viewpoint is a graphical representation of social mapping data displayed on a client device. A viewpoint may show an area of a map encompassing 100 meters, 1000, meters, 10 km, etc. In one or more embodiments a viewpoint may be based on a type of area shown on a map. For example, a viewpoint may be of a smaller area (e.g., a relatively smaller area of a map is shown on a display) if the area is an urban environment and/or includes many locations associated with posts, or a viewpoint may be of a larger area (e.g., a relatively larger area of a map is shown on a display) if the area is a rural environment. The same may be applicable to areas where a threshold amount of posts (e.g., social mapping data) are located regardless of a type of an area represented on a map.

In addition to a social mapping module 106 and a viewpoint generation module 105, system 100 may include a communication means which can include a client device, a network, a multi-tenant network (e.g., the cloud), a network interface controller, a network gateway, etc.

In one or more embodiments, a client device may submit a post to data store 102. Such a post may include a graphical symbol received by a client device. The post may be associated with an emotional state received by the client device, which may be represented by a color. In one or more embodiments, an emotional state may be represented as a value. For example, a user of a smartphone may provide input to smartphone causing the creation of a post, and the user may cause the smartphone to cause the post to be associated with a location, an emotional state value (e.g., where 0 is sad and 10 is happy, and where other numbers may represent angry, depressed, bored, etc.) and other things including, but not limited to: a store, a person, another user of the social network, an image, a video, audio, a time, a date, a symbol, a pictograph, an ideograph, an ideogram, a smiley, an emoji, an emoticon, an emoji bubble (e.g., a shape including/containing an emoji). In one or more embodiments, a user may not know an emotional state value. For example, a user may select an emotional state of sad without knowing that a system represents sad with a value such as 0. In one or more embodiments, emotional state values may be represented by both symbols and values.

In one or more embodiments, system 100 (which the social network may at least in part run on) may receive posts, which may be stored in data store 102. System 100 (e.g., via social mapping module 106) may create a map and/or associate posts with locations on a map, which may then be transmitted to a client device and displayed on a screen of a client device. Based on input from a client device, system 100 (e.g., mapping module 106 and/or viewpoint generation module 105), which may be hosted remotely from a client device, may associate material to display on a client device including, but not limited to: at least a portion of a map, at least one or more posts which may be represented by one or more symbols, one or more colors representative of an attribute associated with a post (e.g., an emotion), an emoji, an emoji bubble, an image (e.g., of a location), a video (e.g., of the interior of a location, which may have been recorded within a particular period of time such as the previous hour), etc.

In one or more embodiments, screen attributes of a client device may be determined. Determining screen attributes of a client device may be performed at the client device or remote from the client device (e.g., at social mapping module 106 and/or viewpoint generation module 105). Screen attributes may include, but is not limited to: a size and shape of a screen, a current zoom level, a pan location, an availability of screen space, a viewing angle, an amount of transparency of a screen, and/or an amount of screen space. Further, screen attributes may be used to determine what is shown on a display, including, but not limited to: an amount of a map, a number of posts, a number of symbols representing posts, whether multiple posts/symbols should be represented by fewer (e.g., a single or a few) posts and/or symbols, a number of emojis, notifications associated with a social network, an amount of icons, types of illustrations, and/or a resolution of one or more displayed objects.

In one or more embodiments, post data associate with a post may be displayed on at least one client device. Such post data (as discussed above) may include, but is not limited to: a time and/or date, text, images, videos, a shape connoting location information, information about an area of a map, related posts, a symbol associated with a post, an emoji, an emoji bubble, a color, a color associated with an emotion. In one or more embodiments, a post includes post data, which may be displayed on a client device based at least in part on the screen attributes. For example, a particular amount of posts may be shown on the screen of a client device based on the size of the screen (e.g., the display of the client device).

Figure 2:
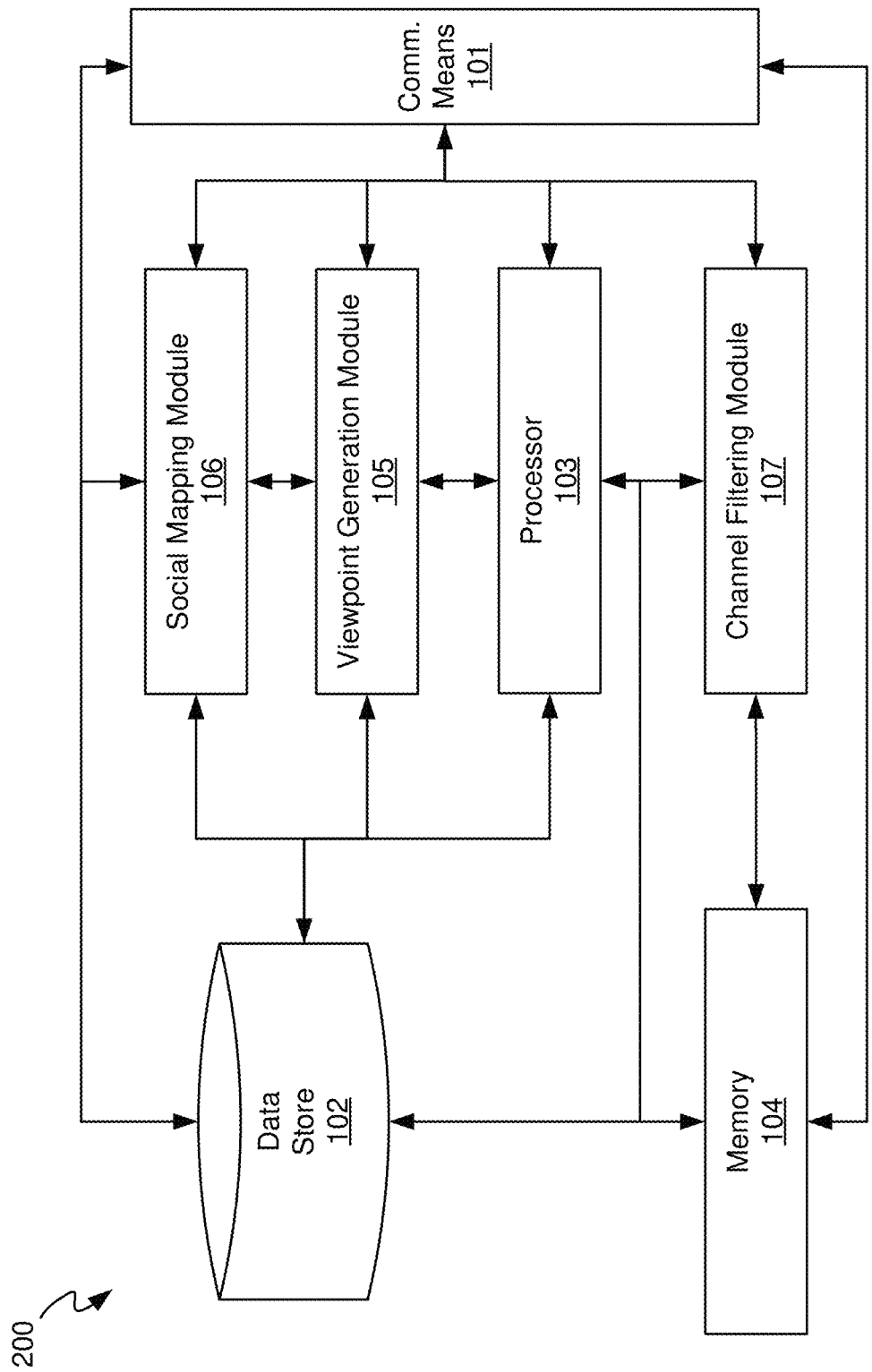

FIG. 2 illustrates system 200, which is similar to system 100 but further includes a channel filtering module 107.

Channels are discussed above, and may be used to reduce an amount of posts shown on a display (and may also be referred to as a filter). In one or more embodiments, a channel may include a set of posts (e.g., a channel may filter posts, which may be shown on the display of a client device). Such a set of posts may be related based on attributes of the channel/set of posts (also referred to herein as post attributes), including, but not limited to: a keyword, a tag linked to/associated with the channel/set of posts, a hashtag, a region, a city, a proximity, a common location, an event, a location, a type of location (e.g., a bar, a club, a deli, a sushi restaurant, a stadium, a park), a type of food, a set of social network connections (e.g., selecting a channel may cause posts from a particular set of network users to be displayed on a client device), posts comprising a certain weight (e.g., an amount of upvotes, an amount of downvotes, an aggregate amount of upvotes and downvotes, an amount of comments, an amount of upvotes of comments of a post, a user's preferences, a time associated with comments, and/or a time associated with the post(s). In one embodiment, a post may be based on a channel (e.g., a user may make a post to a certain channel), and the channel may include a set of posts.

In one or more embodiments, a channel may be created and saved (e.g., using channel filtering module 107 and/or other modules included in system 200). For example, in some embodiments a user may cause a "Channels" screen to appear on their smartphone, and a list of channels may be displayed. From this screen, for instance, a user may click a button to add a new channel (also referred to as a map channel).

In one or more embodiments, the system may provide a user with options for the map channel. Such options may include attributes associated with a map (e.g., street names, topography, what types of points of interest to show, whether to show locations of social network connections, etc.). In one or more embodiments, a user may create a name for a new channel.

In one or more embodiments, a user may enter a description of a channel, cause the channel to be private (e.g., such that only the user can view it, or such that only the user and their social network connections (or a subset thereof) can view it). A channel may be restricted in some embodiments (e.g., where private channels may be viewed by fewer people than a restricted channel (e.g., where only the user may view the private channel and only a user's connections may view the restricted channel)). In one or more embodiments, a user may invite their contacts to view a channel. For example, the system may provide a user with a list of their connections (e.g., "friends"), and then a user may select which of their friends may view the channel. In one or more embodiments, a user may select who can view their channel by selecting users from a contact list (e.g., contacts on a phone/associated with a SIM card), or they may select users based on their user name on the social network.

In one or more embodiments, when creating a channel, a location may be selected, a time/day of the week/recency of posts may be selected, and other attributes as described throughout the instant application.

In one or more embodiments, a user may format/create/modify a channel by creating a bounding box representing a location of a map (e.g., by cropping an image of a map). Such a bounding box (also referred to as a geo boundary) may be a square, rectangle, circle, rhombus, or any other shape. At any point in time, a user may save a channel such that they can return to it a later point in time. In one or more embodiments, a user may share their created channel with one or more connections or other users of a social network.

Figure 3A:
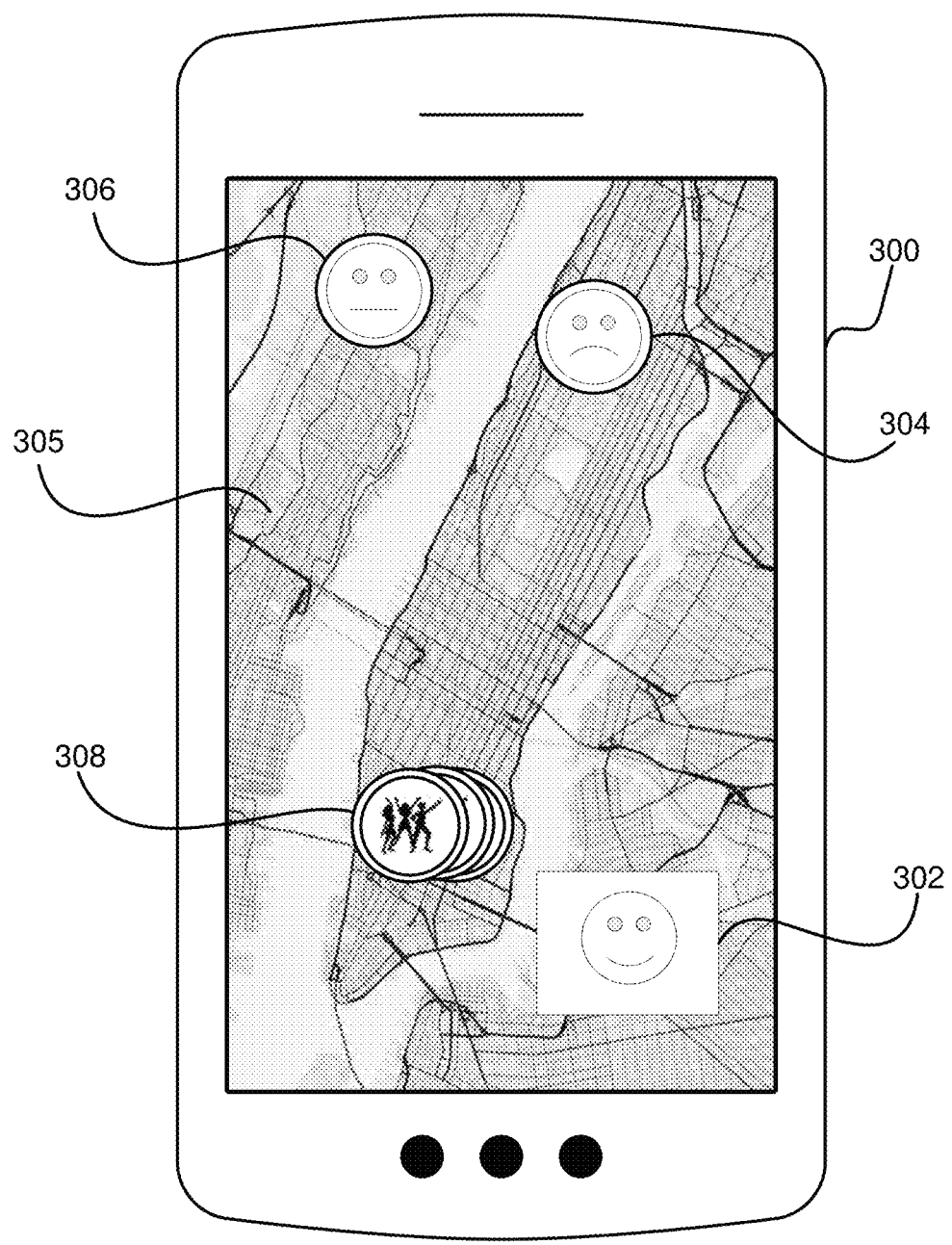
FIGS. 3A-3E illustrate an exemplary client devices, in accordance with one or more embodiments of the invention.

FIG. 3A illustrates an example client device 300, according to various embodiments. Client device 300 includes a display 305 including a map, and a plurality of symbols 302, 304, 306, and 308 representing one or more posts, which may be located on the map.

In one or more embodiments, symbol 302 includes a shape including an emoji. The shape included in symbol 302 may include a color which may be representative of an emotion which a user may enter on client device 300. For example, client device 300 may receive input causing it to create a post, and the input may include post data such as a location, symbol, and/or an emotion, all of which may be determined by system 100 and/or entered by a user. In one or more embodiments, a color may be associated with post 302 (e.g., the shape may be colored), and the color may be based on an emotion entered by a user on client device 300.

In one or more embodiments a symbol 304 and 306 may be shown which indicates an emotion. For example, a symbol 304 and 306 may be shown on client device 300 and include an emoji, which may show an indifferent face (e.g., symbol 306) or an unhappy face (e.g., symbol 304).

In one or more embodiments, client device 300 may show on its display 305 an aggregation of posts (e.g., reviews) such as symbol 308. For example, instead of showing a plurality of posts which do not overlap, symbol 308 may indicate the plurality of posts. In one or more embodiments, if a user selects symbol 308 a plurality of at least a portion of reviews may be shown which may be posted by other users of a social network. After a user selects symbol 308, multiple posts may be provided to a user, which may each include at least a portion of a review. In one or more embodiments, a user may view a complete review—which may include images, text, videos, audio, etc.—in response to selecting a review shown after the user has selected the aggregation of posts symbol 308.

In one or more embodiments, social media posts and/or symbols representing social media posts may be represented by an aggregated symbol and/or post in various ways. A particular map view may display a geographic area including many posts, so many posts that it is impractical or impossible to display all posts at once. For example, a map area covering a region may include thousands or more of posts associated with locations within the region. If each individual post were displayed, posts would be so densely shown that they would overlap each other and/or overwhelm a viewer. Instead, these posts may be aggregated into groups (aka post groups), and each post group may be assigned a symbol.

In one or more embodiments, at a low zoom level (e.g., representing the state of New York), the symbols all may be smaller sized symbols (e.g., a dot comprising a few pixels) so that more symbols representing post groups may be shown on the screen, minimizing or eliminating overlap with other symbols.

In one or more embodiments, at a medium zoom level that is more zoomed in than the low zoom level (e.g., representing the Manhattan borough of New York), some or all of the symbols may be changed to larger symbols (e.g., generally smaller or medium-sized emoji symbols) representing post groups. Because there may be more space in the medium zoom level map view, larger symbols may be accommodated such that overlap is minimized or entirely avoided. In some cases, such larger symbols may continue representing the same post group as the corresponding dot symbol that they replace. In other cases, new sets of post groups may be aggregated/generated based on the zoom level.

In one or more embodiments, at a high zoom level that is more zoomed in than the medium zoom level (e.g., representing the East Village neighborhood of Manhattan), some or all of the larger symbols may be replaced by one or more symbols representing individual posts and/or post groups. For example, some or all of the larger symbols may be replaced by individual posts included in the post group represented by the larger symbols. In another example, some or all of the preexisting larger symbols may be replaced by re-aggregated newer larger symbols representing posts included in the post group represented by the preexisting larger symbols. In yet another example, some of the preexisting larger symbols may be replaced by newer larger symbols representing posts included in the post group represented by some of the preexisting larger symbols, while some of the other preexisting larger symbols may be replaced by individual posts included in the post group represented by such larger symbols.

In one or more embodiments, social media posts may be aggregated into post groups based on various grouping criteria. In one or more embodiments, social media posts may be aggregated based on how proximate and/or dense other symbols (representing posts and/or post groups) are with one another. For example, if there are many posts and/or post groups, posts groups containing more posts may be generated, thereby collecting more posts and causing less density of posts and/or post groups in a map view. In one or more embodiments, social media posts may be aggregated based on relevancy with other social media posts. For example, social media posts related to a particular emotional state indication, color theme, location, event, category, and/or topic may be grouped. In one or more embodiments, social media posts may be aggregated based on rankings of the social media post and/or post groups. For example, highly ranked posts and/or post groups may be grouped, thereby being shown in de-aggregated forms earlier in zoom levels than lower ranked posts and/or post groups. In another example, highly ranked posts and/or post groups may be grouped with lowly ranked posts, thereby show the highly ranked posts and/or post groups in de-aggregated forms earlier in zoom levels than lower ranked posts and/or post groups of the group.

In one or more embodiments, one or more tabs corresponding to one or more symbols may be displayed. For example, a tab may be a user interface element depicting metadata related to the symbols. In an example, a tab may display a title, an abbreviation of social media post's content, and/or a category of a post or post group represented by a symbol. Tabs may appear or disappear (e.g., by extending in/out of the symbol, fading in/out, etc.) depending on various factors. For example, a tab may appear when a particular zoom level allows more device screen space to accommodate the tab, then may disappear at a zoomed out zoom level where screen space is less available. In another example, a tab may appear based on a ranking level of a corresponding post, post group, and/or tab contents.

In one or more embodiments, the symbol and/or tab style is based on an emotional state indication associated with the corresponding social media post and/or post group. For example, if an emotional state of "sad" is associated with a post (e.g., selected by an author of the post), a sad face emoji may be selected for depiction of the post. In another example, if an emotional state of "sad" is associated with a post group (e.g., all, a majority, an average, or a median of posts included in the post group are associated with an emotional state selection of "sad"), a sad face emoji may be selected for depiction of the post. In yet another example, if an emotional state of "sad" is associated with a post, and the color blue is associated with the emotional state of "sad", the color blue may be used in depicting a tab corresponding to the post.

It should be appreciated that as a map view zooms out, many or all of these behaviors my work in reverse. For example, when zooming out from a neighborhood to a county view, individual posts may be aggregated into post groups, tabs may disappear, symbols may resize to smaller sizes, etc.

It should be appreciated that various symbol types may be shown during the same view. For example, small dot symbols, small-sized emoji symbols, medium-sized emoji symbols, may be displayed in the same map view concurrently. For example, an individual post depicted by an emoji symbol may be displayed at a lower zoom level based on a high ranking/relevancy, meanwhile an aggregated group depicted by a small dot symbol may be concurrently displayed based on a low ranking/relevancy (of the aggregated group and/or individual posts).

It should also be appreciated that the various symbol types may each represent single post, a post group, or a hybrid grouping of one or more single posts with one or more post groups. For example, a small dot may represent a single post, while an emoji may represent an aggregated post group.

In one or more embodiments, as a user zooms in a map view, a symbol representing more than one post (e.g., a medium sized red circle) may be transformed into one or more symbols/posts (e.g., many small red circles, or vice-versa).

In one or more embodiments, a variety of aggregation methods may be implemented by one or more systems. For example, in one or more embodiments, a system may display aggregated symbols when a user zooms out on a map as much as possible. In one or more embodiments, a system may display single posts/symbols representing a single post when the user zooms in (e.g., even though the single posts may have been incorporated into an aggregate symbol when a map was zoomed out/a larger area of a map/geography was displayed). Various transformations may be applied, and in some cases the types of transformations (e.g., where one symbol turns into many or vice-versa) may be selected/created by a user of a system as described throughout the instant disclosure.

As described above, posts, symbols, and/or aggregated symbols may be ranked. In one or more embodiments a single post and/or symbol may be ranked, or an aggregate symbol may be ranked. In some cases, both may be ranked, and a ranking may be shown for an aggregated symbol when a user zooms out, while a ranking may be shown for an individual post when a user zooms in and/or selects a particular post. In one or more embodiments, aggregation methods may change as a user zooms in. For example, there may be only a few aggregated symbols when a large map is shown, and in response to a user zooming in a system may cause aggregated symbols representing fewer posts to be shown, or simply a post or a symbol representing a single post may be shown in response to a system detecting that a user is zooming in.

In one or more embodiments, an aggregated symbol may be based on emotions. For example, posts associated with happiness may be grouped together when a user has zoomed out (e.g., they may be represented by a small red circle), and when a user begins to zoom in, the posts may be separated.

In one or more embodiments, rankings may also be used to determine which symbols appear on a map, and those symbols may cover other symbols (e.g., based on rankings). For example, posts or aggregated symbols associated with happiness may be shown above other posts, and then be transformed as a user zooms in.

In one or more embodiments a system may allow a user to choose what types of emotions are more likely to be shown on an interface. For example, a user may want posts/aggregated symbols associated with happiness, hominess, drunkenness, or excitement to be shown. They may configure their system to do so (e.g., by creating a channel that performs this), or they may configure a system to cause rankings related to certain emotions be weighted more heavily.

Thus, as a system detects a user zooming in, the system may display more relevant subject matter (e.g., content represented by one or more posts/symbols). As display methods/characteristics change, a user may be able to access more precise information associated with posts, emotions, emoticons, mapmojis, etc. Many pins representing many posts could be impractical because they could cover a whole map or densely cover portions of a map. Thus, techniques described herein may aggregate related posts such that a user can still view a map without having their view of a particular region obstructed. This may occur in the same way that a webpage is organized. E.g., a webpage may contain many subpages which may provide more information about a subject, which may not be on a home page. As a user dives deeper into subpages, they learn more relevant, or in some cases, irrelevant information. Similarly, when a user zooms in on a map, they may be provided with additional information that was not provided on a zoomed-out map (or a homepage).

In other words, in some modes, when a user is zoomed way up, the posts may be aggregated, and when a system detects a change in a zoom level, the posts may be transformed into greater or fewer posts. As such, more relevant posts may be shown when a user is zoomed all the way out, and less relevant posts may be shown when a map is zoomed all the way in (or, in some cases, vice-versa). Changes in aggregation methods may occur also depending on attributes of posts, emotions associated with posts, and/or how a user configures a system. Posts may be ranked individually or in the aggregate, and may be part of a group or alone. In one or more embodiments an application may show an aggregated symbol/post based on rankings of the individual posts/symbols or based on the rankings of the aggregated symbol/post (e.g., emotion). The post that is the most important may be shown first, or on top of other posts. The way posts/symbols are displayed may transform based on a level of zoom, for instance, with the least important posts only popping up (e.g., being displayed) when a user zooms all the way in. The way an emotion/post/symbol is viewed or represented may be a bubble, a mapmoji, bitmoji, an emoticon, an emotive illustration, etc.

In one or more embodiments, text may be shown on display 305. For example, text may be shown indicating an amount of zoom, an amount of votes a post has received, etc. In some embodiments, text may be included in a post and displayed on client device 300. For example, a user may select symbol 306 and text may be shown associated with a post represented by symbol 306. The text may indicate why symbol 306 includes an indifferent emoji. In one or more embodiments, text included in a post may be used to create symbol 306. For instance, text discussing how bad a location is may cause a symbol (e.g., symbol 304) to be associated with a post, wherein the symbol denotes an unhappy emotion (such as an emoji with an unhappy face).

Figure 3B:
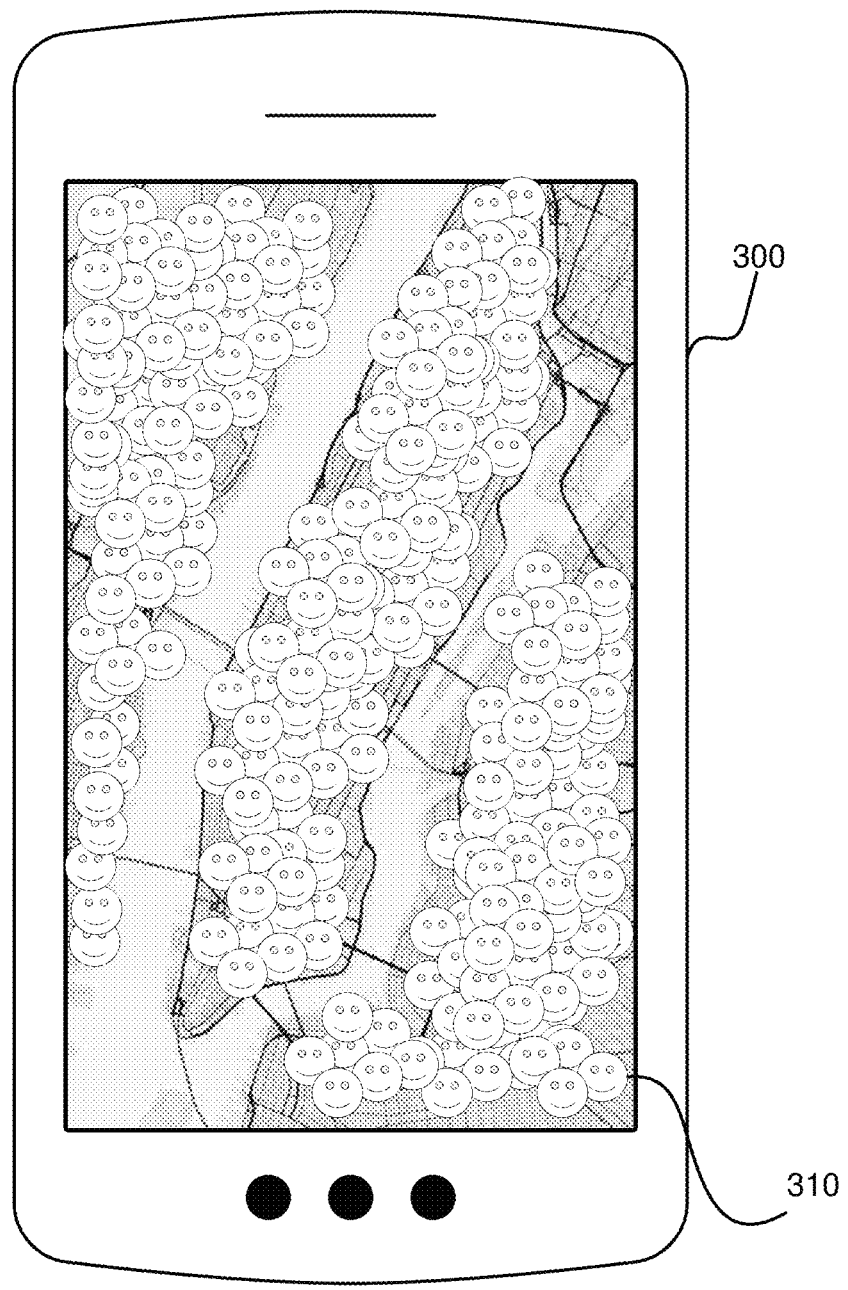

FIG. 3B illustrates an example client device 300, according to various embodiments. As can be seen on example client device 300, and as described throughout the instant disclosure, in some embodiments a plurality of reviews may be shown on a display so much so that use of the map is impaired. For example, the display shown in FIG. 3B includes so many symbols representing posts that a user cannot sort through them all. As such, systems and methods described herein may cause a display to provide posts in a more digestible manner. For example, posts may be aggregated such that a single symbol may represent a plurality of posts, and thus the posts may not clutter screen space. In addition, or as another method, posts may be filtered at least by attributes such that only a subset of posts are shown (e.g., posts may be filtered by a type of restaurant, music playing at a venue, etc.).

Figure 3C:
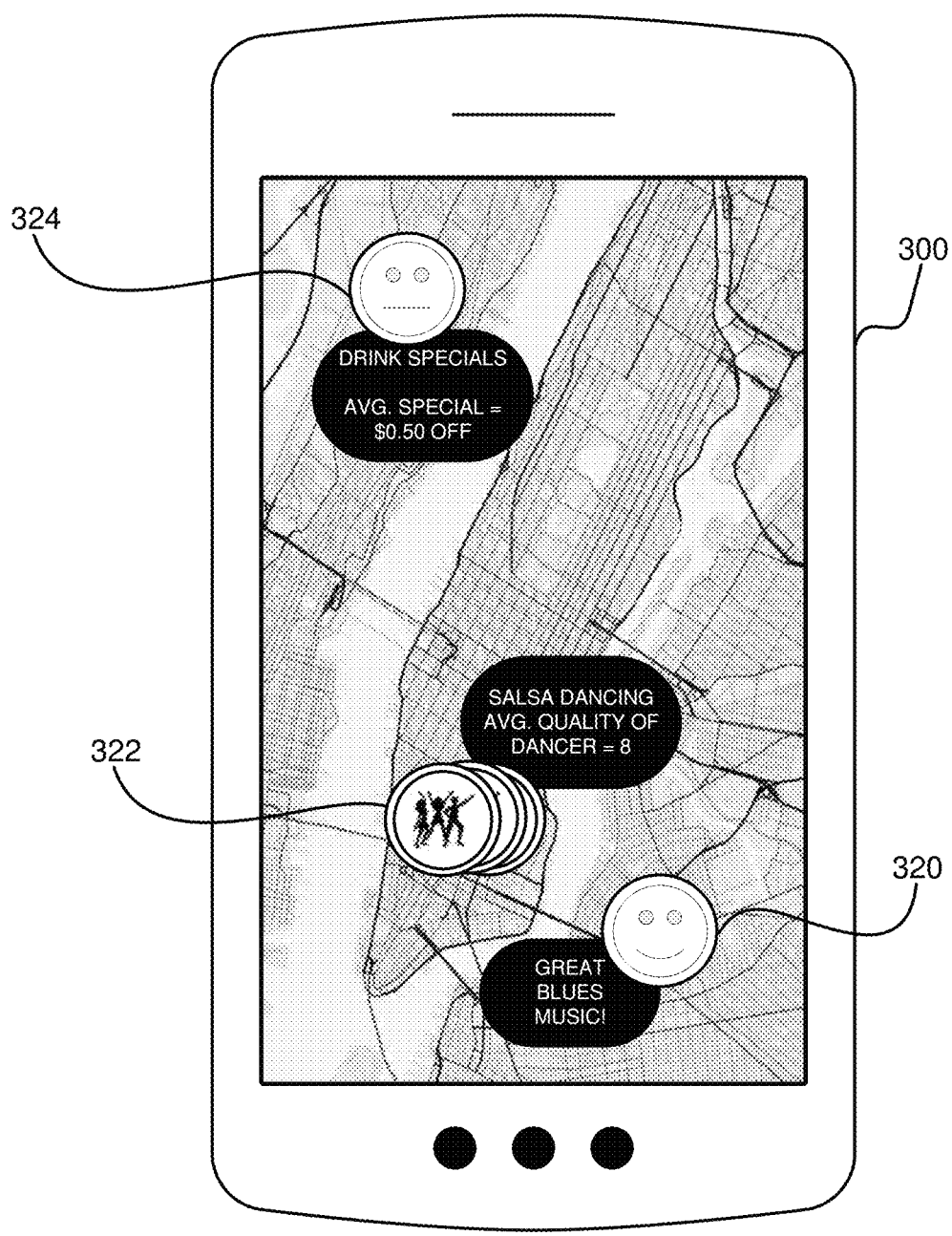

FIG. 3C illustrates an example client device 300, according to various embodiments. Client device 300 includes symbols 320, 322, and 324. In one or more embodiments, symbols 320, 322, and 324 may be symbols that are an aggregate of two or more posts. In addition, some posts may be associated with text.

In one or more embodiments, text may be altered. For example, text may be altered by appearing or disappearing on display 305 based on a variety of factors. Text may be displayed on a tab, wherein the tab is associated with a symbol (e.g., a tab may be emerging from a symbol (also referred to as a graphical symbol)). Altering text may include displaying additional text, or less text. In one or more embodiments, text may be altered based on an input received by a client device such as where a tab is selected. For example, text shown in FIG. 3C may correspond with symbol 320, and may show more or less text, at least a portion of which says, "GREAT BLUES MUSIC!"

Moreover, text may include an indication of a value associated with an attribute. In one or more embodiments, various symbols or other representations of posts may be shown based on values (e.g., rankings) associated with particular attributes. For example, a user may filter posts/aggregated posts (which may be used interchangeably herein with creating and/or viewing a channel). In one or more examples, as shown in example FIG. 3C, posts may be filtered by nightlife.

Various attributes, such as drink specials, salsa dancing, and blues music may be attributes that are filtered. For example, continuing the example, Broadway shows may be filtered out (and may have been shown on the cluttered map in FIG. 3B. Posts, symbols, etc. may be shown over others based on rankings/values associated with the attributes. For example, many dancing symbols 322 may be shown, and text corresponding to the dancing symbols may show that the average salsa dancer at one or more locations has a skill level of 8. Thus, in some embodiments, this set of posts/aggregated symbol may be shown rather than one in another part of town. Similarly, an attribute such as drink specials may be associated with an ambivalent face as shown by symbol 324 and its corresponding text. In some embodiments, a plurality of attributes corresponding with one or more locations may correspond to a plurality of rankings, all of which may be used to determine how many, a type of, and/or where a symbol/post may be shown on a map, as described herein.

In one or more embodiments, instead of rankings corresponding with attributes corresponding to a post, or in combination with rankings corresponding to attributes associated with a post, a post itself may be based on a relevance number. In one or more embodiments, a post may be based on a relevance number. A relevance number may be based on various attributes including, but not limited to: a time that a post was recorded, a number of votes received by a post, a number of positive/up votes received by a post, a number of negative/down votes received by a post, an aggregation of a number of positive/up and negative/down votes received by a post, a number of comments received by a post (e.g., associated with a post), a number of positive/up votes received by comments associated with a post, a time of at least one comment, and/or a comment relevance (e.g., whether the comment has something to do with the post, whether the comment was posted by user's connection within a social network).

Figure 3D:
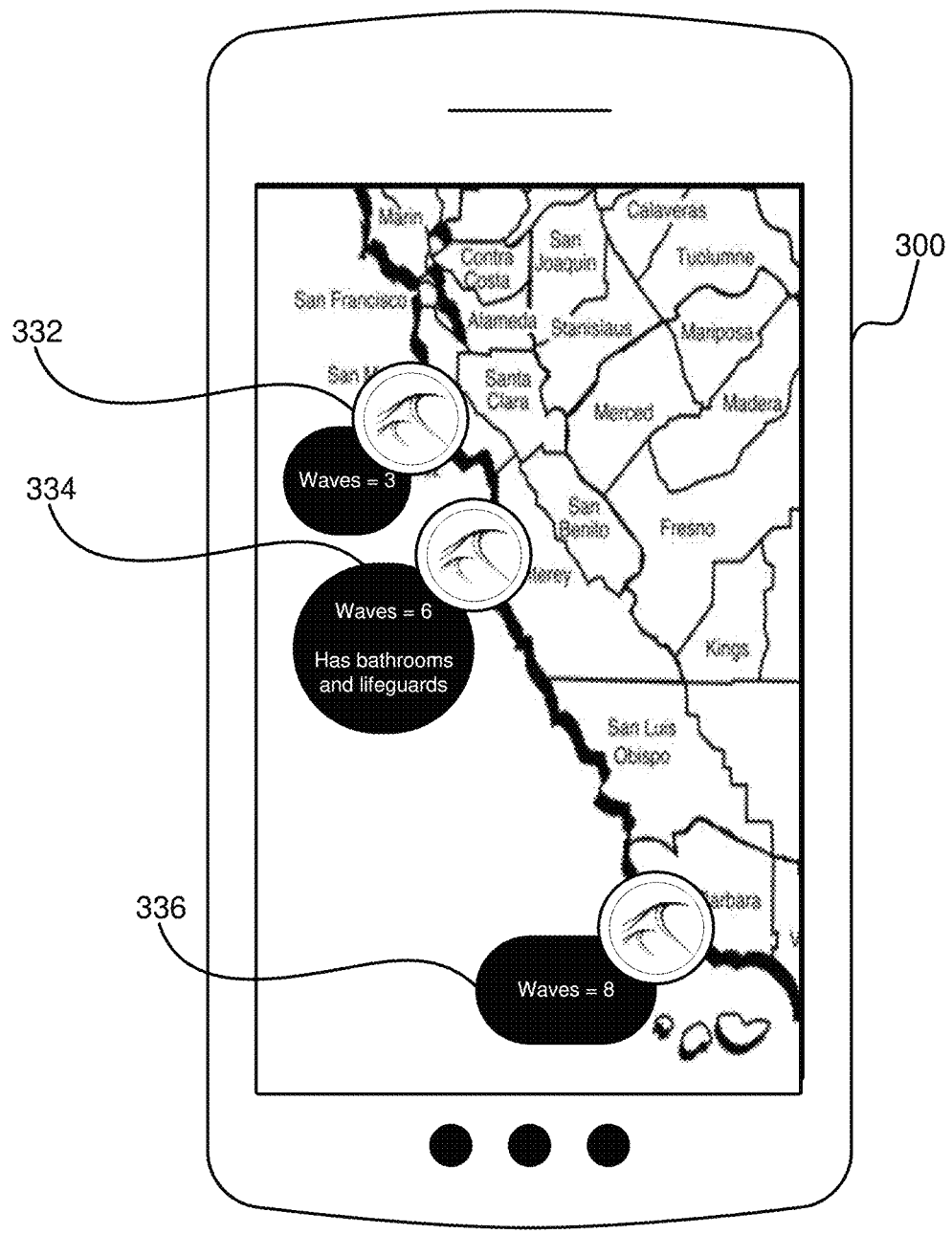

FIG. 3D illustrates an example client device 300, according to various embodiments. As with 3C, attributes of symbols 332, 334, and 336 may be shown based on rankings associated with their attributes. For example, symbol 336 may be shown based on an attribute that indicates the quality of waves associated with beach/symbol 336. In one or more embodiments, information corresponding with an attribute of a post or symbol may be received from a system from a canonical (e.g., third-party source). For example, information from a beach information website may provide a system with the quality of waves. Similarly, in some embodiments, information provided by a website such as Yelp!™ may be used to determine a value of an attribute corresponding to a location/post. As another example, an RSS feed (e.g., from a twitter account) may be used to rank attributes, create posts, and/or determine which posts/symbols will be displayed on a client device. In some embodiments, a post/symbol such as 332 may not be shown because its value associated with waves is only 3. However, it may be shown—despite its wave ranking of 3—based on rankings provided by one or more users. For example, a combination of the rankings of attributes of a post (e.g., the quality of waves, wherein waves are an attribute of a location) may be combined with rankings of a post itself (e.g., a beach in Santa Cruz where people are surfing).

In one or more embodiments, may create/define attributes to be included in posts (e.g., ocean wave quality for surfing), and optionally specify properties of the attribute (e.g., a rating system of 1-10). Rankings of posts or post groups may be based on these user-submitted attributes and/or properties.

In some embodiments, a cumulative ranking of a post/group of posts may be based on rankings of multiple attributes. For example, a post/symbol 334 of a beach in Monterey may indicate that the quality of waves is a 6, and that the beach has bathrooms and lifeguards such that children may go into the water there. In one or more embodiments, the cleanliness of the bathrooms may be ranked and/or the quality of the waves—which may all be included in the overall ranking of the location (e.g., whether it may be shown on a particular map created by one or more users).

As described throughout this disclosure, a beach in Santa Cruz may be a location about which a post may be made. Many posts may be aggregated into a single post such that a map is not cluttered. A post and/or aggregated post (which may be represented by a symbol) may have attributes associated with it/corresponding to it (e.g., waves). In one or more embodiments, the attributes may have their own rankings, which may affect which or whether a post/symbol is shown on a map on a client device. An example of an attribute with its own ranking would be an attribute such as waves, which are ranked by a quality (e.g., surfability, size, etc.).

Figure 3E:
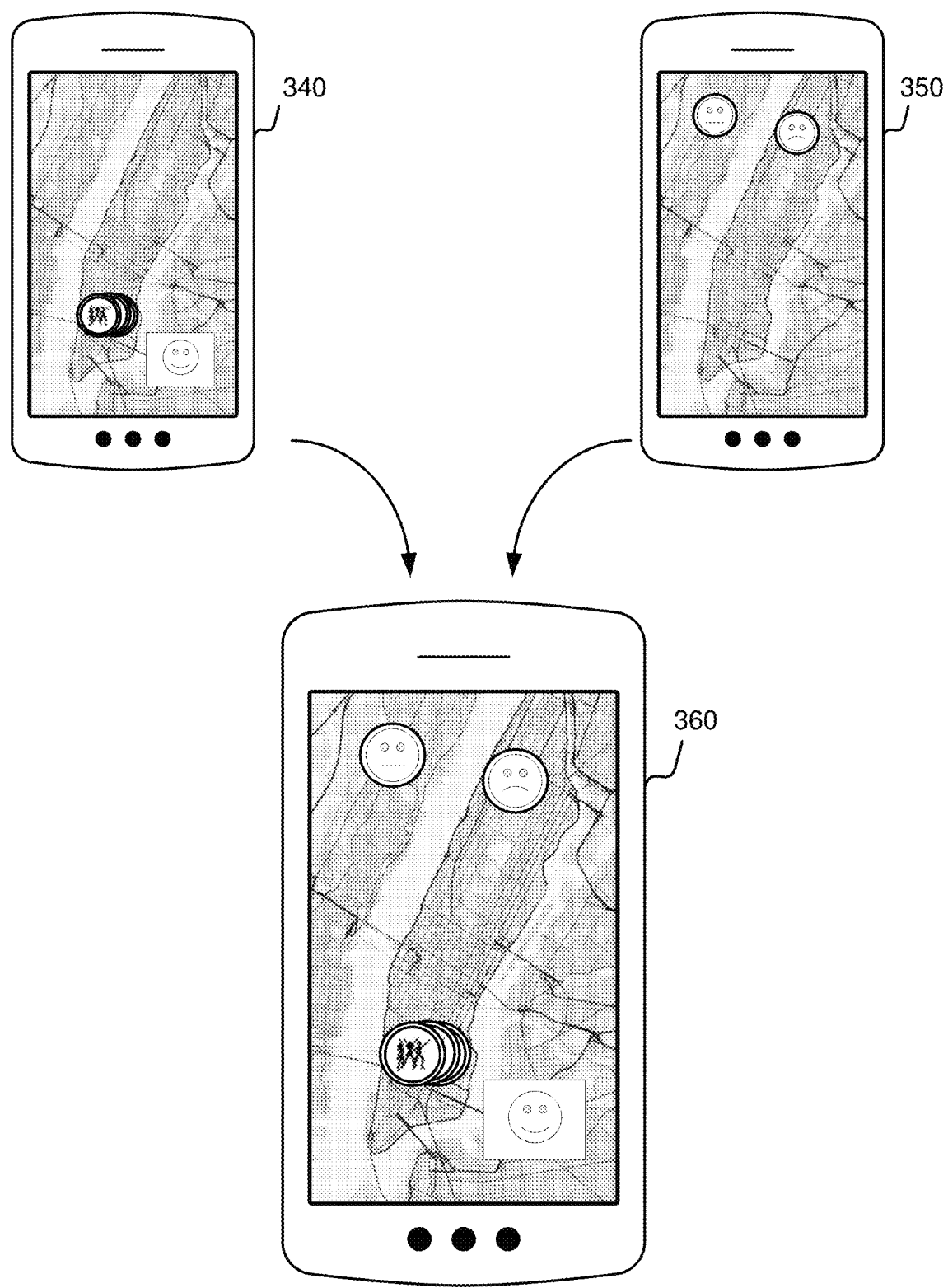

FIG. 3E shows an example of multiple maps combined into one. For example, a map shown on device 340 may be a first user's map which may be filtered by locations above a particular point. A map shown on device 350 may be filtered to show locations below a particular point. In one or more embodiments described herein, a user (e.g., a user of client device 360) may select multiple filtered maps (e.g., the maps shown on devices 340 and 350, which may have been created by strangers and/or connections) and combine those maps to be shown on their own screen. In one or more embodiments, a discussion about channels included herein may be applied to such an embodiment, since in some embodiments channels and filters may be used interchangeably to described substantially the same functionality.

In some embodiments, a map may include every post and/or symbol representing every post made (e.g., to a social network). Users may configure their maps however they like. As discussed herein, a user may select a shape and size of a map shown on their mobile device, as well as the types posts shown by using filters/channels. In some embodiments, such as those shown in FIG. 3E, a user may cause symbols/posts from another user's system to be shown on their device (e.g., map). Many maps from many users may be shown on a user's device in a similar fashion (e.g., the information shown on devices 340 and 350 may be shown on device 360). In some embodiments, a user may import all types of information onto their system. For example, a user may import one, two, three, or ten filtered maps (e.g., maps including posts wherein the posts are shown based on a location, attribute, ranking, etc.) onto their own device (and these filtered maps may be shown on their device). In some embodiments, a user may filter the imported filtered posts/maps/symbols such that their screen is not cluttered and/or they see the types of posts/symbols that they would like to see. As with any post/symbol/attribute, they may be ranked and/or text may be included and/or altered (e.g., to show more or less text as in FIG. 3C) based on preferences of a user. In one or more embodiments, a combination of maps may be referred to as an atlas.

Figure 4:
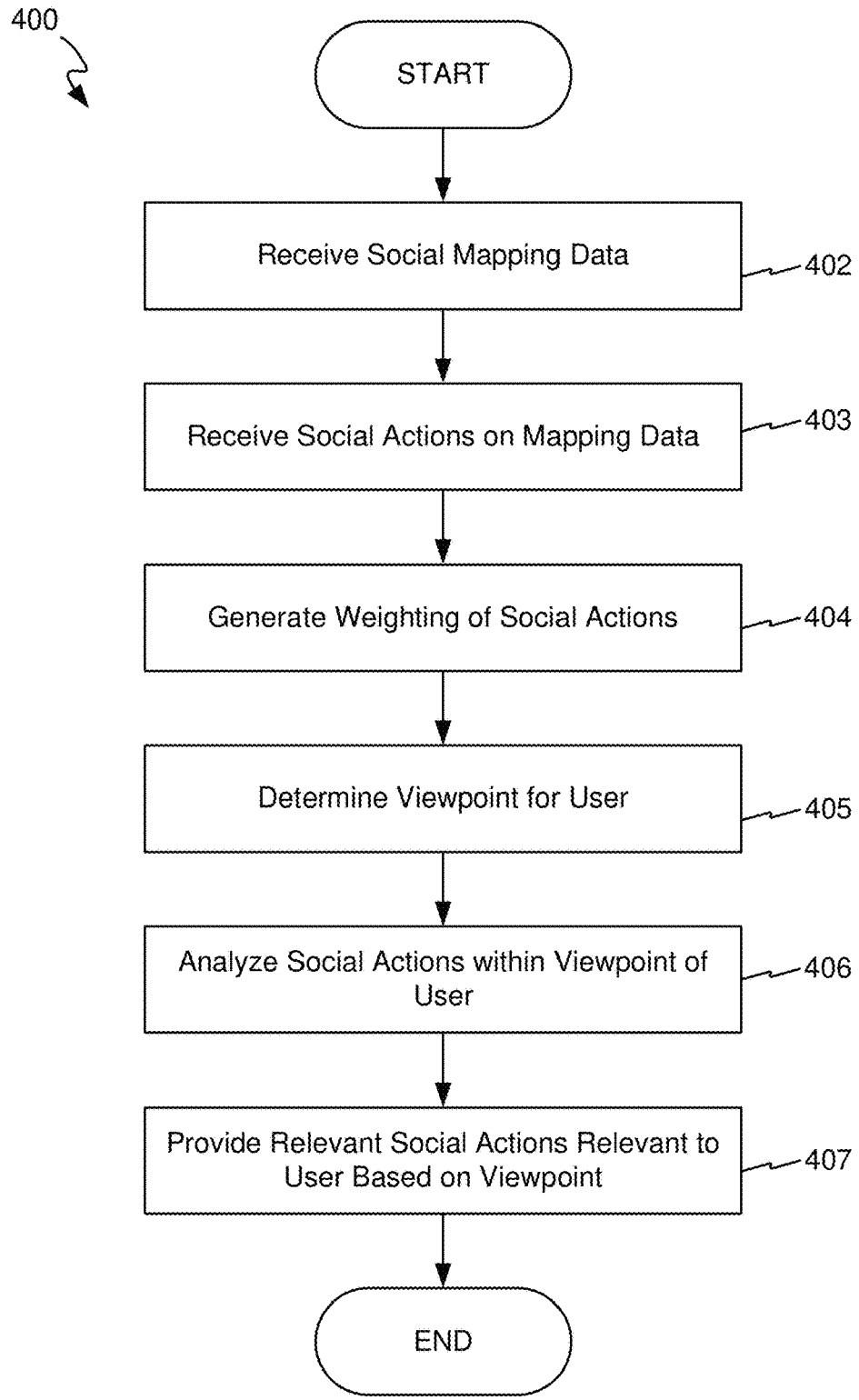
FIGS. 4-6 illustrate flowcharts of exemplary processes, in accordance with one or more embodiments of the invention.

FIG. 4 shows a flowchart 400 of a method for receiving social networking data. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 402 social mapping data is received. In one embodiment, social mapping data may be related to geographic locations where a system is receiving posts. For example, a post may be submitted to a social networking system (e.g., systems 100 or 200) and a system and/or a client device may associate a location with the post.

In STEP 403 social actions on social mapping data may be received. Social mapping data may be received over time, as users provide posts and post data to system 100. The system may aggregate and rank social post data. Social post data may be aggregated based on one or more data points, such as relevance to one another (e.g., social post data type, category, proximity, sentiment/emotion). In one or more embodiments there are numerous manners in which social post data may be related or relevant to one another. In one or more embodiments users may be provided with the ability to rate (e.g., upvote and downvote) various social posts, increasing or decreasing their respective relevance and rank.

In STEP 404, system 100 may generate a weighting of social actions (e.g. posts) related to one another. Rankings and relevance of posts may be generated. In one or more embodiments only, connections to a user on a social network may vote/comment on their posts, while in other embodiments anyone on a social network may vote/comment on a user's posts.

In STEP 405 a viewpoint of a user may be determined. In one embodiment, a viewpoint is a graphical representation of a social mapping (e.g., a map including posts) presently in view on a user's device. A viewpoint may be based on an amount of posts within an area, a channel, attributes associated with a channel, attributes associated with an area shown on a map (e.g., urban or rural), a time of day, whether a user has been to a particular location shown within an area of a map, etc.

In STEP 406, social actions within a viewpoint of a user are analyzed. In one embodiment, a system may retrieve information and data related to a social action (e.g., posts related to one another) present in the viewpoint of a user and use previously generated weightings to determine a display priority (e.g., what posts may be displayed) for each social action (e.g., a category of posts/channel).

In STEP 407, social actions (e.g., a relevant set of posts) relevant to a user based on their viewpoint may be provided. In one embodiment a system may provide such data prioritized by previously generated weightings. For example, if a viewpoint has more posts that can be displayed due to the number of posts exceeding screen real estate, a system may display the most relevant posts in front of other posts or at a time prior to displaying other posts. In one or more embodiments a system may be capable of cycling through aggregated social actions (e.g., display at least a portion of a post/review before or after displaying a portion of a different post/review). When cycling, a system may display the most relevant (e.g., highest voted) posts (or portions thereof) first when cycling through aggregated social actions/posts.

Figure 5:
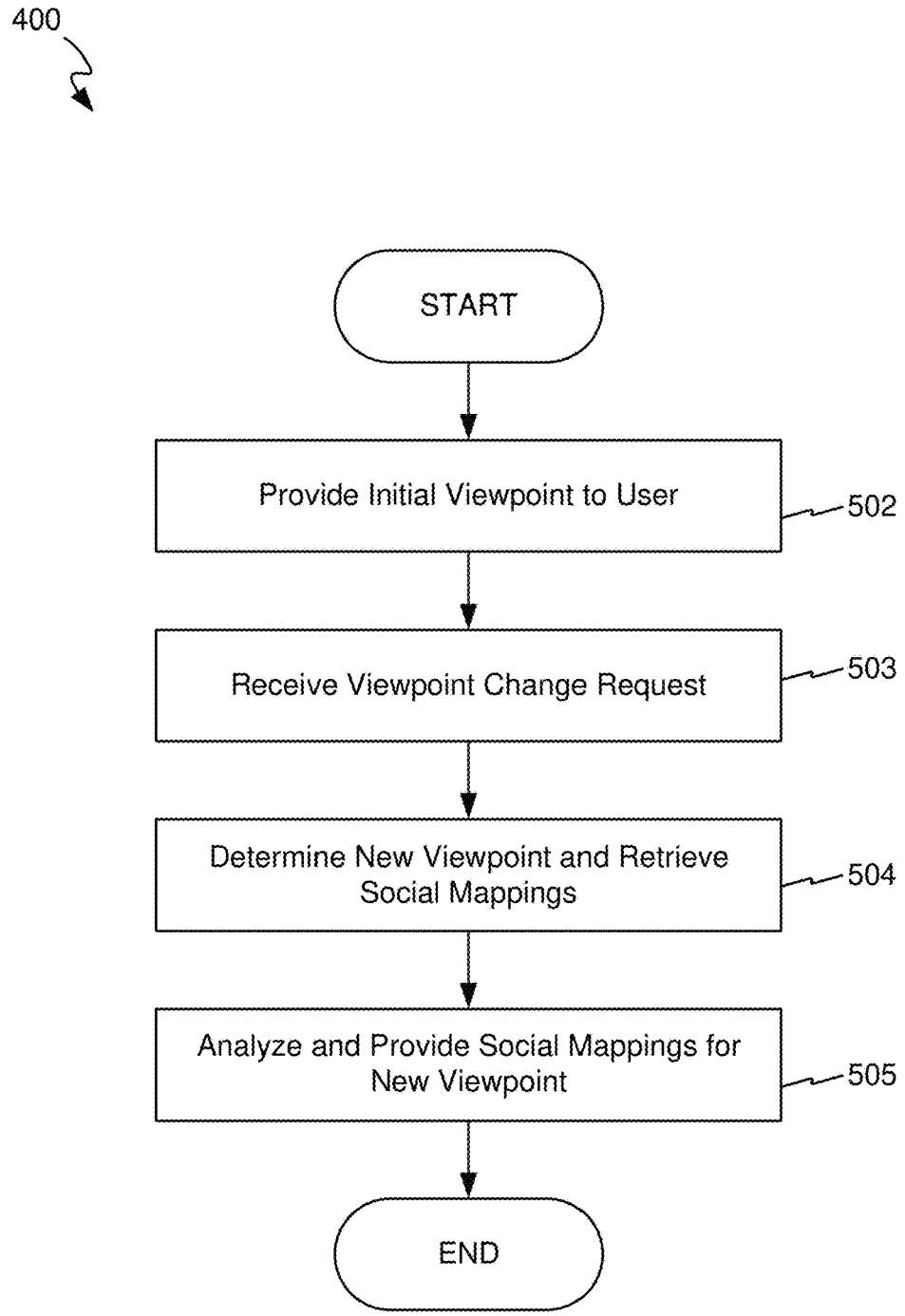

FIG. 5 shows a flowchart 500 of a method for receiving social networking data. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

At STEP 502, an initial viewpoint may be provided to a user. A viewpoint can be set at a distance for appropriate viewing on a client device based on an amount of posts. In one or more embodiments, a viewpoint may be a fixed distance (e.g., it may show an area as if the viewpoint were viewing an area from a certain distance above). In one or more embodiments a system may determine how active a displayed area is (e.g., based on how many posts there are/how often posts are made within a displayed area) and determine whether to resize the displayed area.

At STEP 503, a viewpoint change request is received. This request may be based on how many posts are in a current viewpoint and/or how often posts are made within a current viewpoint. In one or more embodiments, a client device may receive a request to expand or reduce a viewpoint (e.g., an area of a map displayed on a client device).

At STEP 504 a new viewpoint (e.g., a displayed area of a map) may be determined and social mappings (e.g., posts) may be retrieved. In one embodiment, posts may be received by a client device (or transmitted from a portion of a system remote from a client device) and display the posts in the newly displayed area of the map.

At STEP 506 social mappings for a new viewpoint may be analyzed and provided (e.g., to a client device). In one embodiment, this may include generating weightings of posts in order to determine a relevancy of each post within an area of a map. After such an analysis has been performed, a certain/threshold number of posts (or symbols representing posts) may be displayed on a client device.

Figure 6:
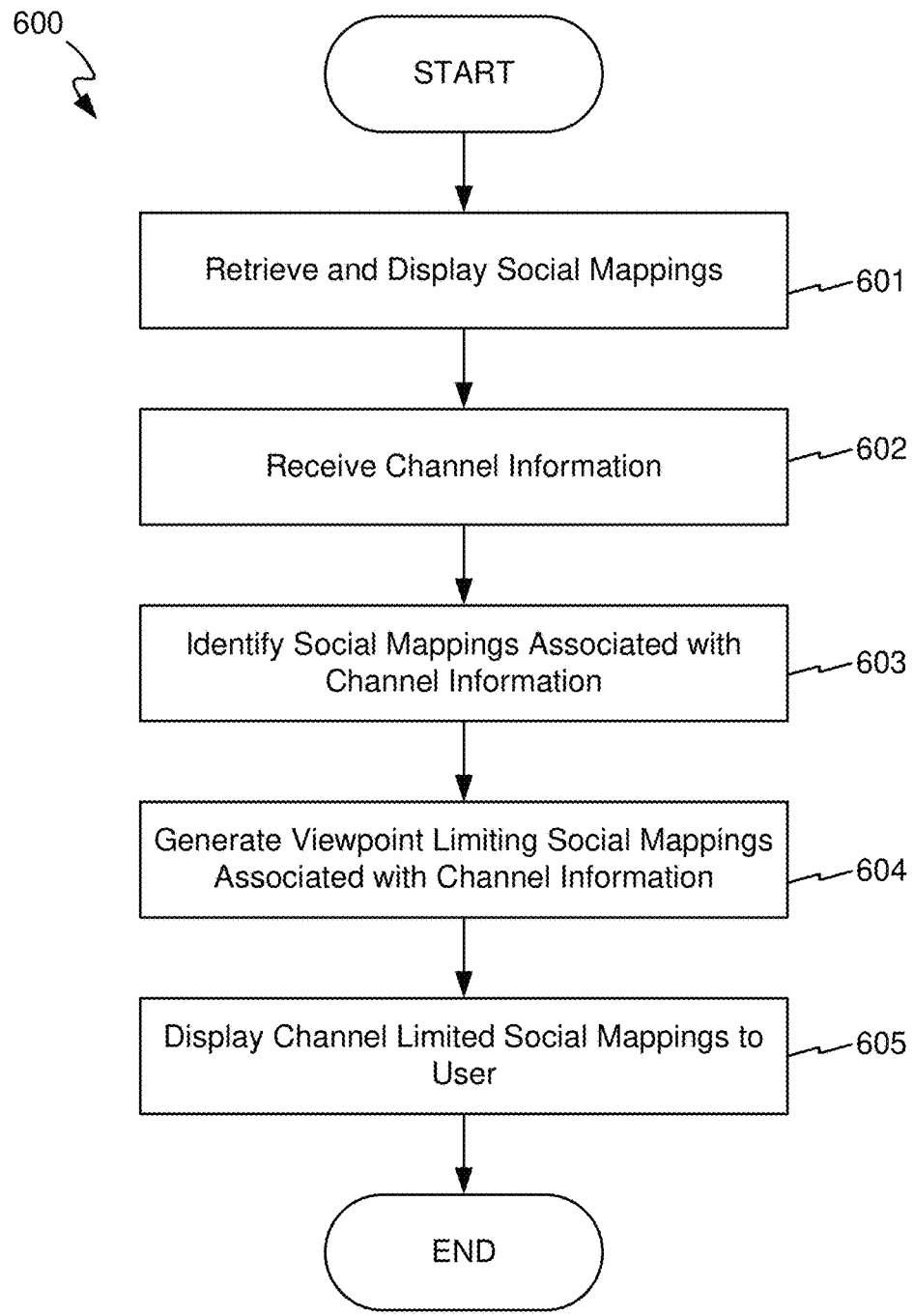

FIG. 6 shows a flowchart 600 of a method for receiving social networking data. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention.

At STEP 601 social mappings (e.g., posts) are retrieved and displayed. In one or more embodiments, symbols representing one or more posts are received and displayed. These may or may not be within a current viewpoint.

At STEP 602 channel information is received. As discussed above channel information may be used to filter posts (including symbols, portions of posts, etc.) to limit an amount of representations of posts on a current display. For instance, a channel may filter subject matter such as a type of location and/or a type of connection that created a post included in a set of posts included in a channel.

At STEP 603 social mappings associated with channel information are identified. In one or more embodiments all posts that have been tagged with metadata corresponding/associated with a channel may be displayed (or at least a representation of the posts may be displayed) on a display of a client device.

At STEP 604 a viewpoint is generated that only displays social actions that have been identified with appropriate channel information. In one or more embodiments, posts or portions thereof may be displayed on a client device only when they are associated with one or more particular channels. For example, portions of posts from two or more channels may be displayed on a client device in response to a selection of one or more channels.

At STEP 605 a channel is displayed that limits social mapping to a user. In one embodiment, a user that has selected one or more channels is only shown posts (e.g., symbols representing at least one post, a portion of a post) that are included in the one or more channels that were selected.

Embodiments of the invention may be implemented on one or more computing systems including mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 7:
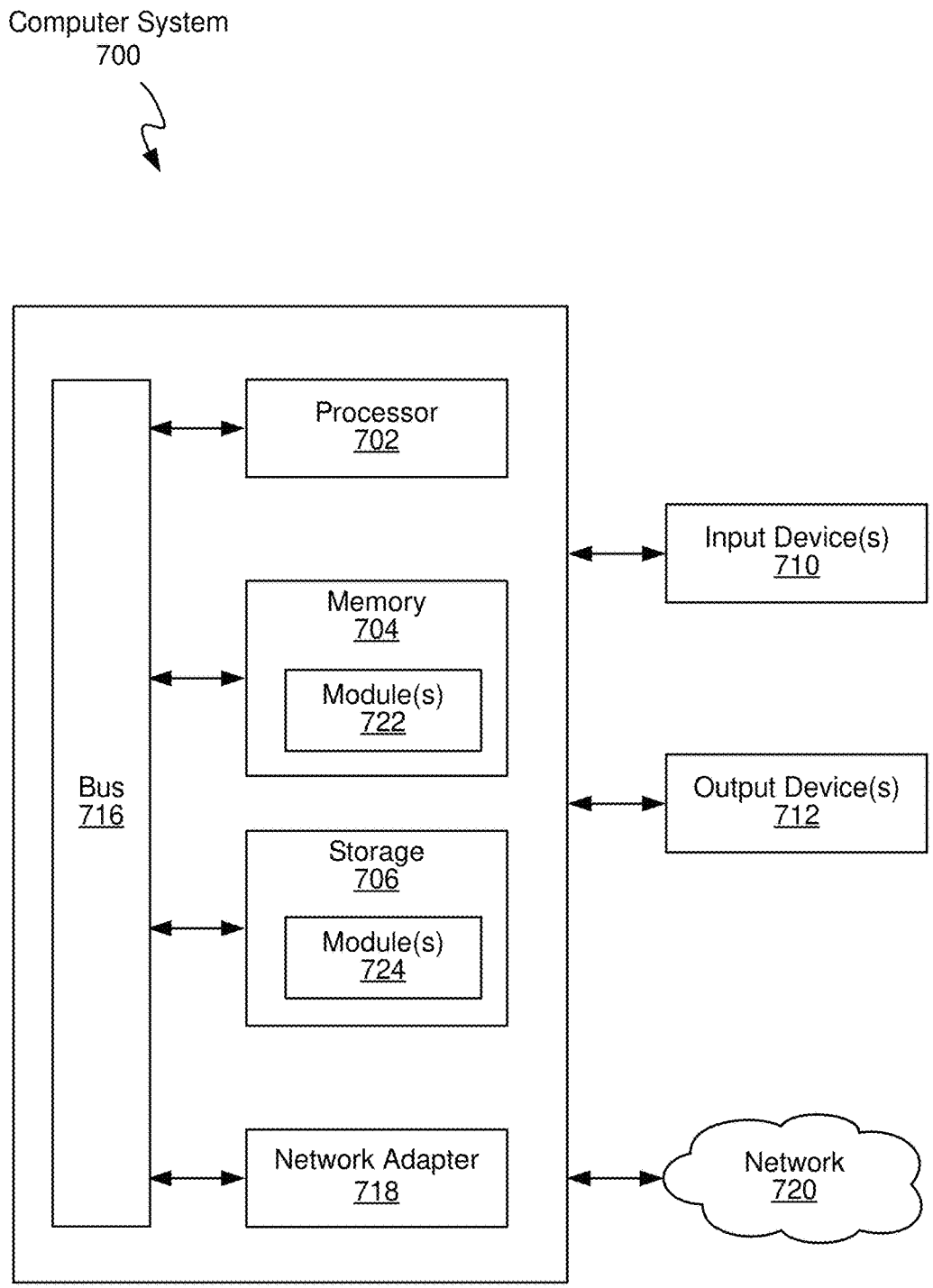
FIG. 7 illustrates an exemplary block diagram of a computing system, in accordance with one or more embodiments of the invention.

For example, as shown in FIG. 7, the computing system 700 may include one or more computer processor(s) 702, associated memory 704 (e.g., random access memory (RAM), cache memory, flash memory, etc.), one or more storage device(s) 706 (e.g., a hard disk, an optical drive such as a compact disk (CD) drive or digital versatile disk (DVD) drive, a flash memory stick, etc.), and numerous other elements and functionalities. The computer processor(s) 702 may be an integrated circuit for processing instructions. For example, the computer processor(s) may be one or more cores or micro-cores of a processor. The computing system 700 may also include one or more input device(s) 710, such as a touchscreen, keyboard, mouse, microphone, touchpad, electronic pen, or any other type of input device. Further, the computing system 700 may include one or more output device(s) 708, such as a screen (e.g., a liquid crystal display (LCD), a plasma display, touchscreen, cathode ray tube (CRT) monitor, projector, or other display device), a printer, external storage, or any other output device. The computing system 700 may be connected to a network 714 (e.g., a local area network (LAN), a wide area network (WAN) such as the Internet, mobile network, or any other type of network) via a network interface connection 718. The input and output device(s) may be locally or remotely connected (e.g., via the network 712) to the computer processor(s) 702, memory 704, and storage device(s) 706.

One or more elements of the aforementioned computing system 706 may be located at a remote location and connected to the other elements over a network 714. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1, 2, and 3) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1, 2, and 3) and/or flowcharts (e.g., FIGS. 3, 4, and 5). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A system for location-based social networking, comprising:
   a computer processor; and
   a social mapping module executing on the computer processor and configured to enable the computer processor to:
   receive, from a client device, a first request for one or more social media posts, wherein the first request comprises location information and a first set of screen attribute information about a display of the client device, and wherein the first set of screen attribute information is related to the location information;

identify a set of social media posts based at least on the location information;

generate a ranking of each social media post of the set of social media posts according to relevancy with other social media posts of the set of social media posts;

generate an aggregated group comprising a subset of the set of social media posts based on (i) the set of screen attribute information, (ii) a desired grouping density, and (iii) the ranking of at least the subset of the set of social media posts;

generate an aggregated graphical symbol based on the aggregated group, wherein the aggregated graphical symbol represents the aggregated group, and wherein generating the aggregated graphical symbol comprises at least one selected from a group consisting of:

(i) selecting the aggregated graphical symbol based on an average of graphical symbols selected by authors of each social media post of the set of social media posts;

(ii) selecting the aggregated graphical symbol based on a median of graphical symbols selected by authors of the set of social media posts;

(iii) selecting the aggregated graphical symbol based on emotional states selected by authors of the set of social media posts; and (iv) selecting the aggregated graphical symbol based on colors selected by authors of the set of social media posts; and provide, in response to the first request, the aggregated graphical symbol for display by the client device.

2. The system of claim 1, wherein the social mapping module is further configured to enable the computer processor to:

determine a cardinality of the aggregated group, wherein the aggregated graphical symbol includes a visual attribute associated with the cardinality.

3. The system of claim 1, wherein generating the ranking of each social media post of the set of social media posts according to relevancy with other social media posts of the set of social media posts is based on at least one selected from a group consisting of:

geographic density of location metadata corresponding to each social media post, emotional state metadata corresponding to each social media post, color theme metadata corresponding to each social media post, and a recency corresponding to each social media post.

4. The system of claim 1, wherein generating the aggregated graphical symbol based on the aggregated group comprises:

determining a display size of the aggregated graphical symbol, based on the first screen attribute information, such that the aggregated graphical symbol will not overlap with other aggregated graphical symbols on the display.

5. The system of claim 1, wherein the social mapping module is further configured to enable the computer processor to:

associate a color with the aggregated graphical symbol, wherein the color is selected based on at least one selected from a group consisting of:

a predetermined look-up-table mapping graphical symbols to colors, colors associated with the set of social media posts included in the aggregated group, colors selected by authors of the set of social media posts included in the aggregated group, and colors associated with emotional states selected by authors of the set of social media posts included in the aggregated group.

6. The system of claim 1, wherein the social mapping module is further configured to enable the computer processor to:

receive, from the client device, a second request including a user interaction involving the aggregated graphical symbol; and provide, in response to the second request, at least one social media post of the aggregated group.

7. The system of claim 1, wherein the social mapping module is further configured to enable the computer processor to:

receive, from the client device, a second request for one or more social media posts, wherein the second request comprises second set of screen attribute information about the display of the client device, wherein the second set of screen attribute information is different from the first set of screen attribute information;

identify a second set of social media posts based on the second set of screen attribute information;

generate a ranking of each social media post of the second set of social media posts according to relevancy with other social media posts of the second set of social media posts;

generate a second aggregated group comprising a subset of the second set of social media posts based on (i) the second set of screen attribute information, (ii) the desired grouping density, and (iii) the ranking of at least the subset of the second set of social media posts;

generate a second aggregated graphical symbol based on the second aggregated group, wherein the second aggregated graphical symbol represents the second aggregated group; and provide, in response to the second request, the second aggregated graphical symbol for display by the client device.

8. The system of claim 1, wherein:

providing the aggregated graphical symbol for display by the client device comprises providing text for display in a tab configured to emerge from a second graphical symbol on the client device; and the social mapping module is further configured to enable the computer processor to provide instructions to the client device to alter the text for display.

9. A method for location-based social networking, comprising:

receiving, from a client device, a first request for one or more social media posts, wherein the first request comprises location information and a first set of screen attribute information about a display of the client device, and wherein the first set of screen attribute information is related to the location information;

identifying a set of social media posts based at least on the location information;

generating, by a computer processor, a ranking of each social media post of the set of social media posts according to relevancy with other social media posts of the set of social media posts;

generating an aggregated group comprising a subset of the set of social media posts based on (i) the set of screen attribute information, (ii) a desired grouping density, and (iii) the ranking of at least the subset of the set of social media posts;

generating an aggregated graphical symbol based on the aggregated group, wherein the aggregated graphical symbol represents the aggregated group, and wherein generating the aggregated graphical symbol comprises at least one selected from a group consisting of:
- (v) selecting the aggregated graphical symbol based on an average of graphical symbols selected by authors of each social media post of the set of social media posts;
- (vi) selecting the aggregated graphical symbol based on a median of graphical symbols selected by authors of the set of social media posts;
- (vii) selecting the aggregated graphical symbol based on emotional states selected by authors of the set of social media posts; and
- (viii) selecting the aggregated graphical symbol based on colors selected by authors of the set of social media posts; and providing, in response to the first request, the aggregated graphical symbol for display by the client device.

10. The method of claim 9, further comprising:
determining a cardinality of the aggregated group, wherein the aggregated graphical symbol includes a visual attribute associated with the cardinality.

11. The method of claim 9, wherein generating the ranking of each social media post of the set of social media posts according to relevancy with other social media posts of the set of social media posts is based on at least one selected from a group consisting of:
geographic density of location metadata corresponding to each social media post, emotional state metadata corresponding to each social media post, color theme metadata corresponding to each social media post, and a recency corresponding to each social media post.

12. The method of claim 9, wherein generating the aggregated graphical symbol based on the aggregated group comprises:
determining a display size of the aggregated graphical symbol, based on the first screen attribute information, such that the aggregated graphical symbol will not overlap with other aggregated graphical symbols on the display.

13. The method of claim 9, further comprising:
associating a color with the aggregated graphical symbol, wherein the color is selected based on at least one selected from a group consisting of:
a predetermined look-up-table mapping graphical symbols to colors, colors associated with the set of social media posts included in the aggregated group, colors selected by authors of the set of social media posts included in the aggregated group, and colors associated with emotional states selected by authors of the set of social media posts included in the aggregated group.

14. The method of claim 9, further comprising:
receiving, from the client device, a second request including a user interaction involving the aggregated graphical symbol; and
providing, in response to the second request, at least one social media post of the aggregated group.

15. The method of claim 9, further comprising:
receiving, from the client device, a second request for one or more social media posts, wherein the second request comprises second set of screen attribute information about the display of the client device, wherein the second set of screen attribute information is different from the first set of screen attribute information;
identifying a second set of social media posts based on the second set of screen attribute information;
generating a ranking of each social media post of the second set of social media posts according to relevancy with other social media posts of the second set of social media posts;
generating a second aggregated group comprising a subset of the second set of social media posts based on (i) the second set of screen attribute information, (ii) the desired grouping density, and (iii) the ranking of at least the subset of the second set of social media posts;
generating a second aggregated graphical symbol based on the second aggregated group, wherein the second aggregated graphical symbol represents the second aggregated group; and
providing, in response to the second request, the second aggregated graphical symbol for display by the client device.

16. The method of claim 9, wherein:
providing the aggregated graphical symbol for display by the client device comprises providing text for display in a tab configured to emerge from a second graphical symbol on the client device; and
the method further comprises providing instructions to the client device to alter the text for display.

17. A non-transitory computer-readable storage medium comprising a plurality of instructions for location-based social networking, the plurality of instructions configured to execute on at least one computer processor to enable the at least one computer processor to:
receive, from a client device, a first request for one or more social media posts, wherein the first request comprises location information and a first set of screen attribute information about a display of the client device, and wherein the first set of screen attribute information is related to the location information;
identify a set of social media posts based at least on the location information;
generate a ranking of each social media post of the set of social media posts according to relevancy with other social media posts of the set of social media posts;
generate an aggregated group comprising a subset of the set of social media posts based on (i) the set of screen attribute information, (ii) a desired grouping density, and (iii) the ranking of at least the subset of the set of social media posts;
generate an aggregated graphical symbol based on the aggregated group, wherein the aggregated graphical symbol represents the aggregated group, and wherein generating the aggregated graphical symbol comprises at least one selected from a group consisting of:
- (ix) selecting the aggregated graphical symbol based on an average of graphical symbols selected by authors of each social media post of the set of social media posts;
- (x) selecting the aggregated graphical symbol based on a median of graphical symbols selected by authors of the set of social media posts;
- (xi) selecting the aggregated graphical symbol based on emotional states selected by authors of the set of social media posts; and
- (xii) selecting the aggregated graphical symbol based on colors selected by authors of the set of social media posts; and provide, in response to the first request, the aggregated graphical symbol for display by the client device.

18. The non-transitory computer-readable storage medium of claim 17, the plurality of instructions further configured to enable the at least one computer processor to:

determine a cardinality of the aggregated group, wherein the aggregated graphical symbol includes a visual attribute associated with the cardinality.

\* \* \* \* \*